(12) United States Patent
Manly et al.

(10) Patent No.: US 11,644,675 B2
(45) Date of Patent: May 9, 2023

(54) GHOST IMAGE MITIGATION IN SEE-THROUGH DISPLAYS WITH PIXEL ARRAYS

(71) Applicant: Magic Leap, Inc., Plantation, FL (US)

(72) Inventors: David Manly, Fort Lauderdale, FL (US); Vaibhav Mathur, Weston, FL (US); Clinton Carlisle, Parkland, FL (US); Jonathan Alexander Rolon, Miami, FL (US); Chulwoo Oh, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/450,627

(22) Filed: Oct. 12, 2021

(65) Prior Publication Data

US 2022/0026719 A1 Jan. 27, 2022

Related U.S. Application Data

(63) Continuation of application No. 16/994,509, filed on Aug. 14, 2020, now Pat. No. 11,169,380.
(Continued)

(51) Int. Cl.
  *G02F 1/1335* (2006.01)
  *G02B 27/01* (2006.01)
  (Continued)

(52) U.S. Cl.
  CPC ....... *G02B 27/0172* (2013.01); *G02B 27/281* (2013.01); *G02F 1/1393* (2013.01);
  (Continued)

(58) Field of Classification Search
  CPC .............. G02B 27/0172; G02B 27/281; G02B 2027/0178; G02F 1/133502;
  (Continued)

(56) References Cited

U.S. PATENT DOCUMENTS 7,758,185 B2   7/2010   Lewis
8,174,650 B2   5/2012   Sakai et al.
(Continued)

FOREIGN PATENT DOCUMENTS

JP     2014035668 A     2/2014

OTHER PUBLICATIONS

Azuma, "A Survey of Augmented Reality," Presence: Teleoperators and Virtual Environments, Aug. 1997, 6(4):355-385.
(Continued)

*Primary Examiner* — James A Dudek
(74) *Attorney, Agent, or Firm* — Fish & Richardson P.C.

(57) ABSTRACT

A head-mounted apparatus include an eyepiece that include a variable dimming assembly and a frame mounting the eyepiece so that a user side of the eyepiece faces a towards a user and a world side of the eyepiece opposite the first side faces away from the user. The dynamic dimming assembly selectively modulates an intensity of light transmitted parallel to an optical axis from the world side to the user side during operation. The dynamic dimming assembly includes a variable birefringence cell having multiple pixels each having an independently variable birefringence, a first linear polarizer arranged on the user side of the variable birefringence cell, the first linear polarizer being configured to transmit light propagating parallel to the optical axis linearly polarized along a pass axis of the first linear polarizer orthogonal to the optical axis, a quarter wave plate arranged between the variable birefringence cell and the first linear polarizer, a fast axis of the quarter wave plate being arranged relative to the pass axis of the first linear polarizer to transform linearly polarized light transmitted by the first linear polarizer into circularly polarized light, and a second linear polarizer on the world side of the variable birefringence cell.

19 Claims, 17 Drawing Sheets

Related U.S. Application Data

(60) Provisional application No. 62/887,639, filed on Aug. 15, 2019.

(51) Int. Cl.
  *G02B 27/28* (2006.01)
  *G02F 1/13363* (2006.01)
  *G02F 1/139* (2006.01)

(52) U.S. Cl.
  CPC .... *G02F 1/13363* (2013.01); *G02F 1/133502* (2013.01); *G02F 1/133528* (2013.01); *G02B 2027/0178* (2013.01); *G02F 1/133541* (2021.01); *G02F 1/133638* (2021.01); *G02F 2203/48* (2013.01); *G02F 2413/02* (2013.01); *G02F 2413/05* (2013.01)

(58) Field of Classification Search
  CPC ........... G02F 1/133528; G02F 1/13363; G02F 1/1393; G02F 1/133541; G02F 1/133638; G02F 2203/48; G02F 2413/02; G02F 2413/05
  See application file for complete search history.

(56) References Cited

U.S. PATENT DOCUMENTS

| | | | |
|---|---|---|---|
| 8,353,594 | B2 | 1/2013 | Lewis |
| 8,696,113 | B2 | 4/2014 | Lewis |
| 8,733,927 | B1 | 5/2014 | Lewis |
| 8,733,928 | B1 | 5/2014 | Lewis |
| 9,010,929 | B2 | 4/2015 | Lewis |
| 9,235,064 | B2 | 1/2016 | Lewis |
| 9,239,473 | B2 | 1/2016 | Lewis |
| 9,244,293 | B2 | 1/2016 | Lewis |
| 9,658,473 | B2 | 5/2017 | Lewis |
| 10,151,937 | B2 | 12/2018 | Lewis |
| 10,151,960 | B2 | 12/2018 | Huang et al. |
| 10,185,147 | B2 | 1/2019 | Lewis |
| 10,228,566 | B2 | 3/2019 | von und zu Liechtenstein |
| 2006/0203162 | A1* | 9/2006 | Ito .................... G02F 1/1393 349/117 |
| 2010/0289988 | A1 | 11/2010 | Sakai |
| 2016/0247319 | A1 | 8/2016 | Nowatzyk et al. |
| 2016/0282639 | A1 | 9/2016 | Von Und Zu Liechtenstein |
| 2017/0293141 | A1 | 10/2017 | Schowengerdt et al. |
| 2017/0336641 | A1* | 11/2017 | von und zu Liechtenstein ........... G06T 19/006 |
| 2018/0039052 | A1 | 2/2018 | Khan et al. |
| 2019/0179057 | A1 | 6/2019 | Peroz et al. |
| 2019/0179149 | A1 | 6/2019 | Curtis et al. |
| 2020/0074724 | A1 | 3/2020 | Mathur et al. |
| 2021/0003872 | A1 | 1/2021 | Russell et al. |
| 2021/0048676 | A1 | 2/2021 | Manly et al. |

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.

Bimber et al., "Spatial Augmented Reality Merging Real and Virtual Worlds," A K Peters, Ltd. (ed.), 2005, 393 pages.

Hitl.washington.edu [online], "Hardware," available on or before Oct. 13, 2005, via Internet Archive: Wayback Machine URL <https://web.archive.org/web/20051013062315/http:/www.hitl.washington.edu:80/artoolkit/documentation/hardware.htm>, retrieved on Mar. 3, 2021, URL <http://www.hitl.washington.edu/artoolkit/documentation/hardware.htm>, 3 pages.

Jacob, "Eye Tracking in Advanced Interface Design," Virtual environments and advanced interface design, 1995, 258:288, 50 pages.

PCT International Search Report and Written Opinion in International Appln. No. PCT/US2020/046552, dated Nov. 6, 2020, 10 pages.

Tanriverdi et al., "Interacting with Eye Movements in Virtual Environments," Proc, of the SIGCHI Conference on Human Factors in Computing Systems, 2000, pp. 265-272.

Extended European Search Report in European Appln. No. 20852470.2, dated Nov. 4, 2022, 8 pages.

Office Action in Japanese Appln. No. 2022-508821, dated Mar. 10, 2023, 10 pages (with English translation).

* cited by examiner

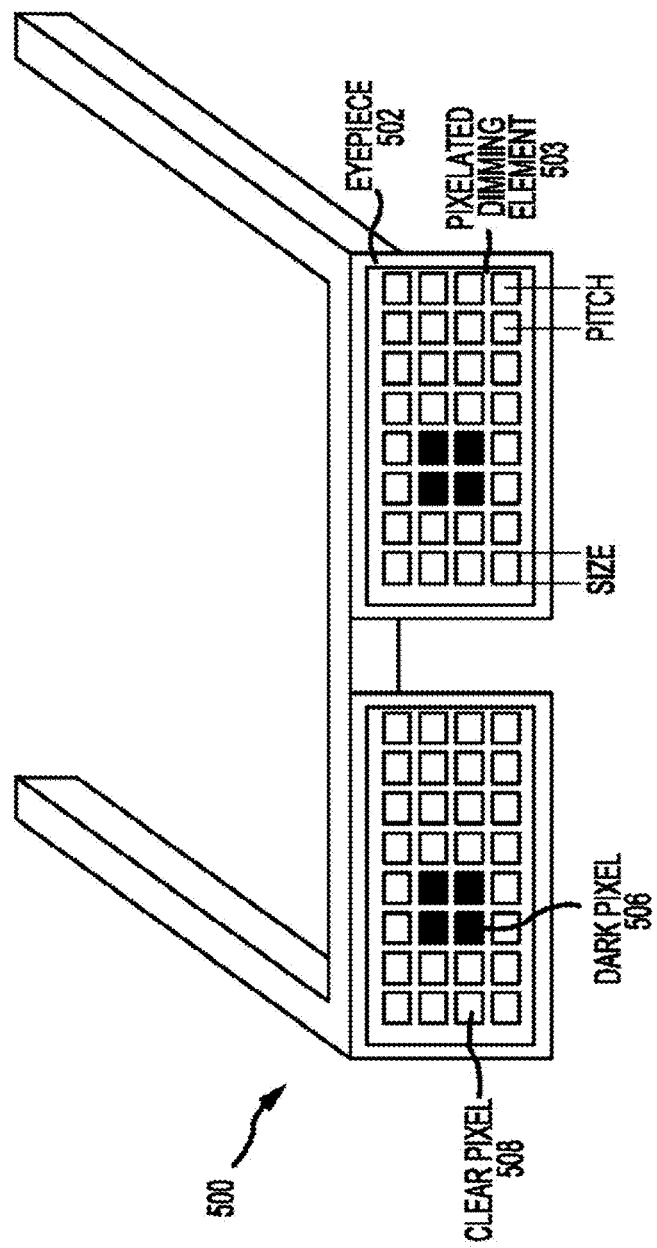

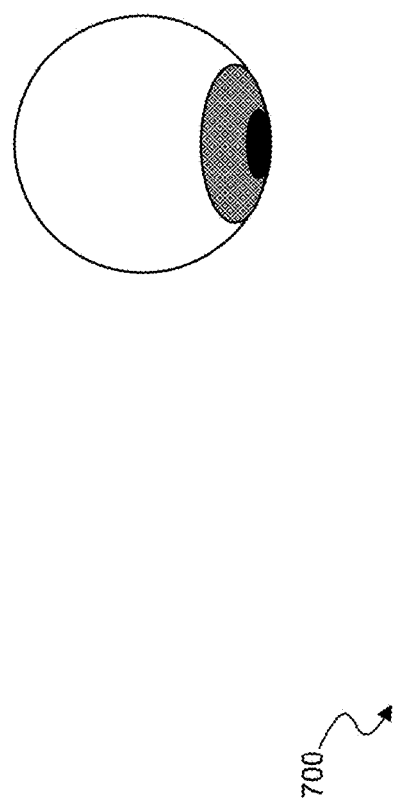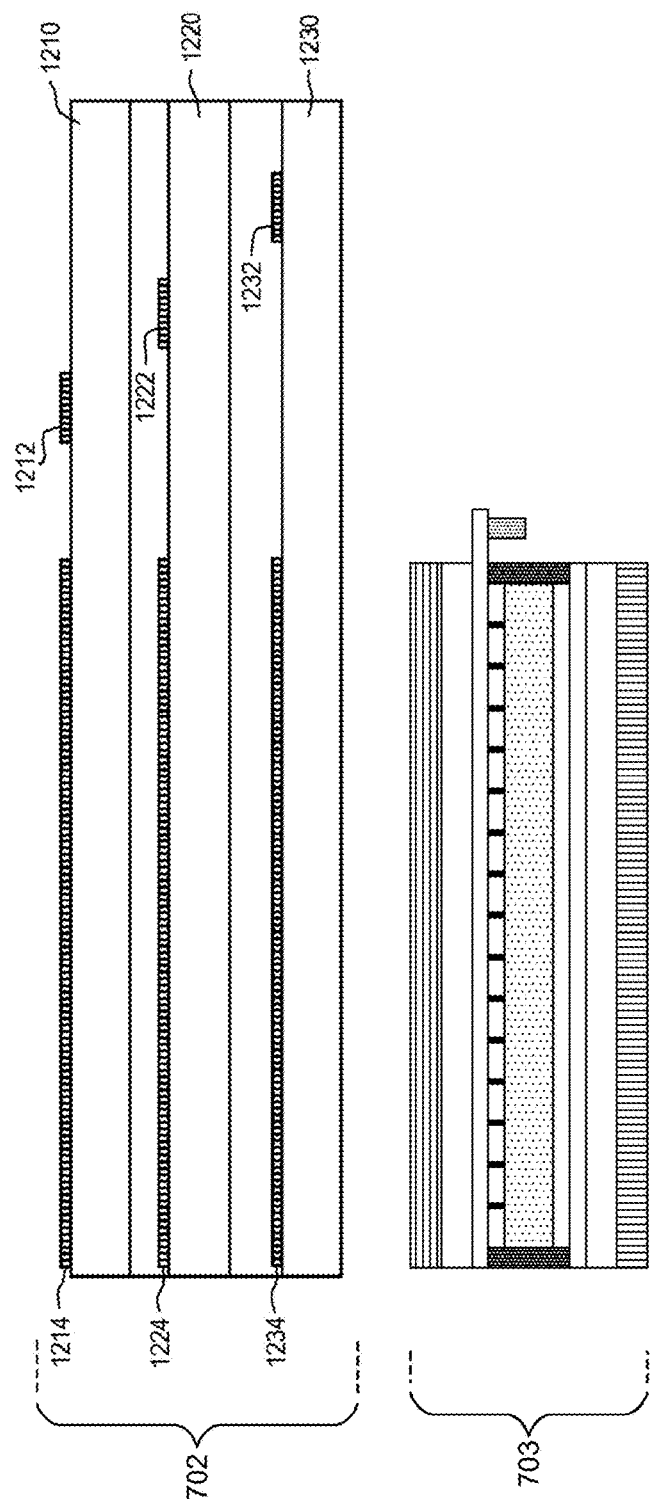
FIG. 7A

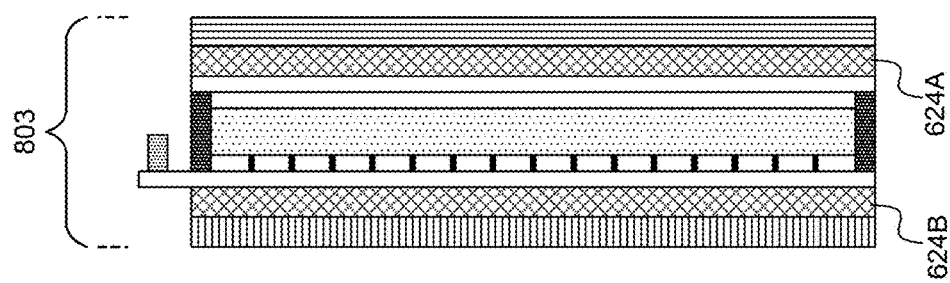
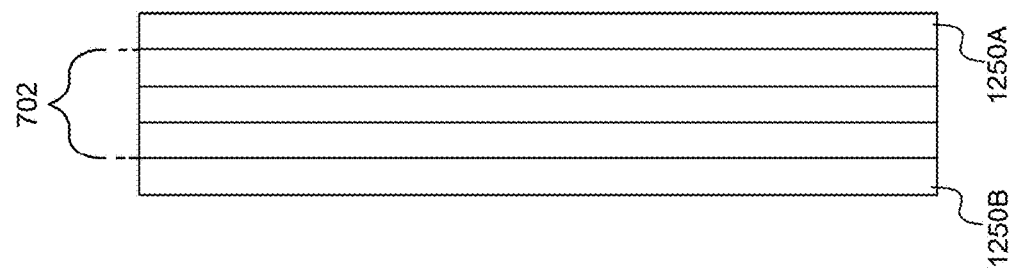
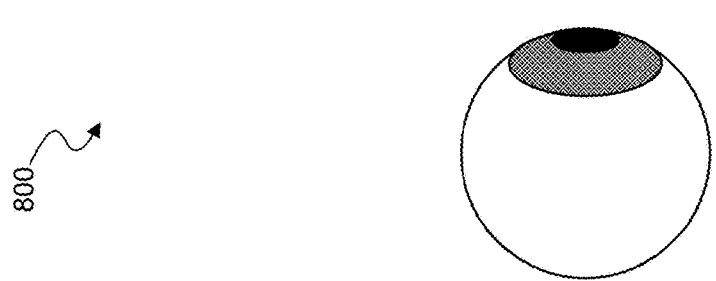
FIG. 8A

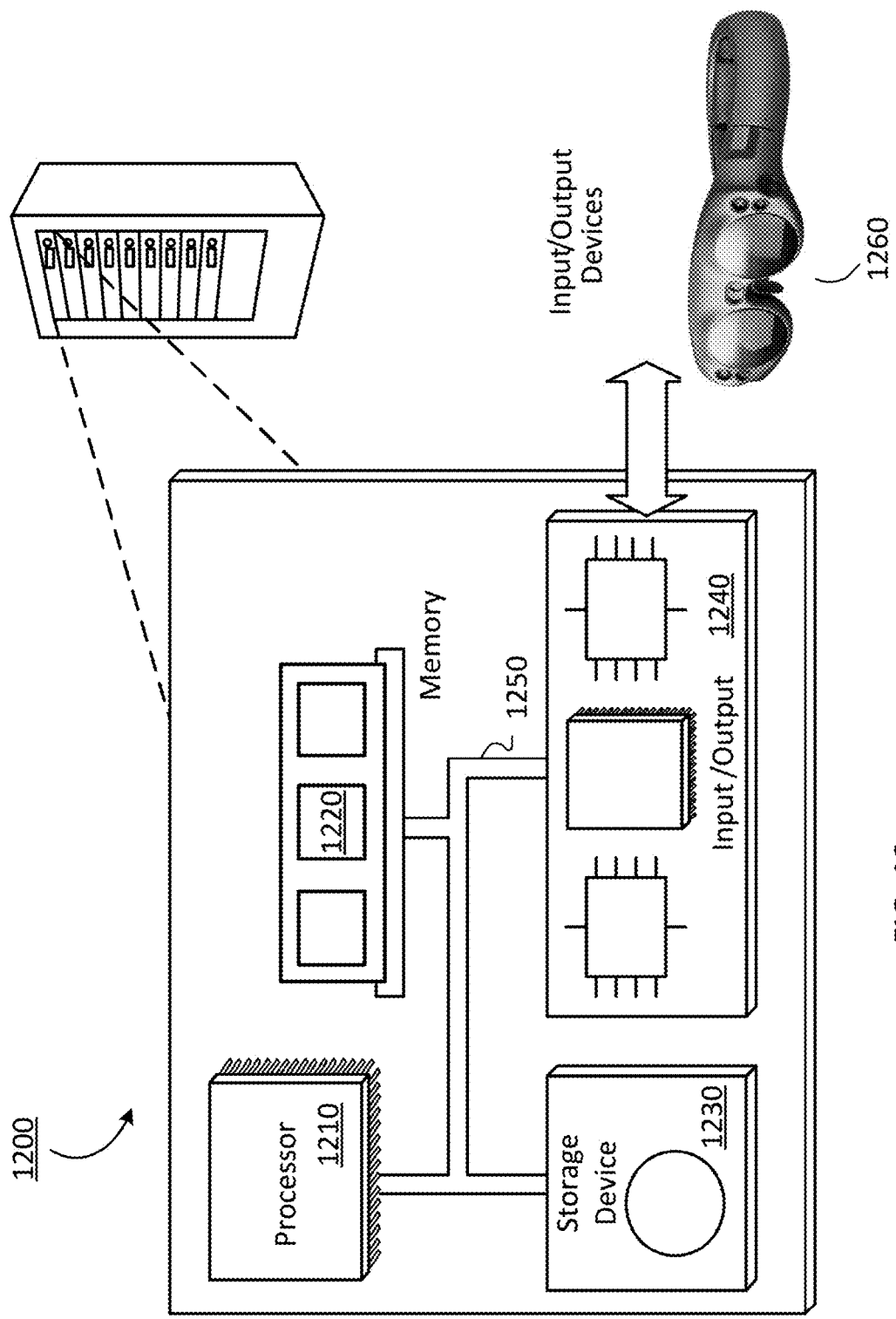

GHOST IMAGE MITIGATION IN SEE-THROUGH DISPLAYS WITH PIXEL ARRAYS

CROSS-REFERENCE TO RELATED APPLICATIONS

This application is a continuation of U.S. application Ser. No. 16/994,509, entitled GHOST IMAGE MITIGATION IN SEE-THROUGH DISPLAYS WITH PIXEL ARRAYS, filed on Aug. 14, 2020, which claims priority to Provisional Application No. 62/887,639, entitled GHOST IMAGE MITIGATION IN SEE-THROUGH DISPLAYS WITH PIXEL ARRAYS, filed on Aug. 15, 2019, the entire contents of which are incorporated by reference.

INCORPORATION BY REFERENCE

This application incorporates by reference the entirety of each of the following patent applications: U.S. patent application Ser. No. 15/479,700, filed on Apr. 5, 2017, published on Oct. 12, 2017 as U.S. Publication No. 2017/0293141; U.S. patent application Ser. No. 16/214,575, filed on Dec. 10, 2018, published on Jun. 13, 2019 as U.S. Publication No. 2019/0179057; U.S. Provisional Patent Application Ser. No. 62/725,993, entitled SPATIALLY-RESOLVED DYNAMIC DIMMING FOR AUGMENTED REALITY DEVICE, filed on Aug. 31, 2018; U.S. Provisional Patent Application Ser. No. 62/731,755, entitled SYSTEMS AND METHODS FOR EXTERNAL LIGHT MANAGEMENT, filed on Sep. 14, 2018; U.S. Provisional Patent Application Ser. No. 62/858,252, entitled SPATIALLY-RESOLVED DYNAMIC DIMMING FOR AUGMENTED REALITY DEVICE, filed on Jun. 6, 2019; and U.S. Provisional Patent Application Ser. No. 62/870,896, entitled GEOMETRIES FOR MITIGATING ARTIFACTS IN SEE-THROUGH PIXEL ARRAYS, filed on Jul. 5, 2019. For every document incorporated herein, in case of conflict, the current specification controls.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

Segmented attenuation using a polarized TFT-LCD panel can greatly increase the visibility and solidity of content without dimming the full field of view of the world. The display light in diffractive waveguide type see through AR displays send light in two directions: one towards the user and one towards the world. The back reflection of the light (e.g., off of reflective components of the dimming assembly, such as metal traces, conductors, layer index mismatches, and TFTs) going toward the world may appear as a "ghost" image next to the primary display image. This ghost image impacts the effective contrast and viewing fidelity of the virtual content and therefore quality of immersion. Mitigating ghost images and stray light paths due to the metal traces, TFTs, layer index mismatches, elements/objects beyond the dimmer, etc. is a difficult problem.

The systems and techniques disclosed herein leverage polarization films of the dimmer as both a system optical isolator and an intra-dimmer optical isolator to effectively suppress such "ghost" images. The addition of index matching fluid/gel between the eyepiece cover glass and the dimmer, where the index is close to the first layer of the dimmer, can mitigate ghosting from the first dimmer surface.

Using quarter waveplates (QWPs) with specifically chosen achromatic properties can allow a liquid crystal dimmer, such as those using an electrically controlled birefringence (ECB) cell, to have less polarization leakage, better chromatic performance and be more color neutral across a relatively wide range of operating conditions.

The present disclosure relates generally to techniques for improving optical systems in varying ambient light conditions. More particularly, embodiments of the present disclosure provide systems and methods for operating an augmented reality (AR) device comprising a dimming element. Although the present invention is described in reference to an AR device, the disclosure is applicable to a variety of applications in computer vision and image display systems.

In general, in a first aspect, the invention features head-mounted apparatus that include an eyepiece that include a variable dimming assembly and a frame mounting the eyepiece so that, during use of the head-mounted apparatus, a user side of the eyepiece faces a towards a user of the head-mounted apparatus, and a world side of the eyepiece opposite the first side faces away from the user. The dynamic dimming assembly is configured to selectively modulate an intensity of light transmitted parallel to an optical axis from the world side of the eyepiece to the user side of the eyepiece during operation of the head-mounted apparatus. The dynamic dimming assembly includes a variable birefringence cell having multiple pixels each having an independently variable birefringence, a first linear polarizer arranged on the user side of the variable birefringence cell, the first linear polarizer being configured to transmit light propagating parallel to the optical axis linearly polarized along a pass axis of the first linear polarizer orthogonal to the optical axis, a quarter wave plate arranged between the variable birefringence cell and the first linear polarizer, a fast axis of the quarter wave plate being arranged relative to the pass axis of the first linear polarizer to transform linearly polarized light transmitted by the first linear polarizer into circularly polarized light, and a second linear polarizer on the world side of the variable birefringence cell.

Implementations of the head-mounted apparatus can include one or more of the following features and/or features of other aspects. For example, the dynamic dimming assembly further includes an optical retarder arranged between the variable birefringence cell and the second linear polarizer. The optical retarder can be a second quarter wave plate. The optical retarder is an A-plate with a retardation greater than a retardation of the quarter wave plate. A difference between a retardation of the optical retarder and a retardation of the quarter wave plate can correspond to a residual retardation of the variable birefringent cell in a minimum birefringence state.

The variable birefringence cell can include a layer of a liquid crystal. The liquid crystal can be configured in an electrically controllable birefringence mode. In some embodiments, the layer of the liquid crystal is a vertically aligned liquid crystal layer. The liquid crystal can be a nematic phase liquid crystal.

The pixels of the variable birefringence cell can be actively addressed pixels.

The eyepiece can further include a see-through display mounted in the frame on the user side of the variable dimming assembly. The see-through display can include one or more waveguide layers arranged to receive light from a light projector during operation of the head-mounted apparatus and direct the light toward the user. The head-mounted apparatus can include one or more index-matching layers arranged between the see-through display and the variable dimming assembly.

In some embodiments, the dynamic dimming assembly includes one or more antireflection layers.

In another aspect, the invention features an augmented reality system including the head-mounted apparatus.

In general, in another aspect, the invention features head-mounted apparatus that include an eyepiece having a variable dimming assembly and a frame mounting the eyepiece so that, during use of the head-mounted apparatus, a user side of the eyepiece faces a towards a user of the head-mounted apparatus, and a world side of the eyepiece opposite the first side faces away from the user. The dynamic dimming assembly is configured to selectively modulate an intensity of light transmitted parallel to an optical axis from the world side of the eyepiece to the user side of the eyepiece during operation of the head-mounted apparatus. The dynamic dimming assembly includes a layer of a liquid crystal, a circular polarizer arranged on the user side of the liquid crystal layer, and a linear polarizer on the world side of the liquid crystal layer.

Embodiments of the head-mounted apparatus can include one or more of the following features and/or features of other aspects. For example, the circular polarizer can include a linear polarizer and a quarter wave plate. The head-mounted apparatus can include an A-plate arranged between the linear polarizer on the world side of the liquid crystal layer.

The head-mounted apparatus can include a pixelated cell including the layer of the liquid crystal, the pixelated cell being an actively addressed pixelated cell.

In general, in a further aspect, the invention features a method of operating an optical system. The method may include receiving, at the optical system, light associated with a world object. The method may also include projecting a virtual image onto an eyepiece. The method may further include determining a portion of a system field of view of the optical system to be at least partially dimmed based on detected information. The method may further include adjusting a dimmer to reduce an intensity of the light associated with the world object in the portion of the system field of view.

In some embodiments, the optical system includes a light sensor configured to detect light information corresponding to the light associated with the world object. In some embodiments, the detected information includes the light information. In some embodiments, the light information includes multiple spatially-resolved light values. In some embodiments, the light information includes a global light value. In some embodiments, the optical system includes an eye tracker configured to detect gaze information corresponding to an eye of a user of the optical system. In some embodiments, the detected information includes the gaze information. In some embodiments, the gaze information includes a pixel location that intersects with a gaze vector of the eye of the user. In some embodiments, the gaze information includes one or more of a pupil position of the eye of the user, a center of rotation of the eye of the user, a pupil size of the eye of the user, a pupil diameter of the eye of the user, and cone and rod locations of the eye of the user. In some embodiments, the method further includes detecting image information corresponding to the virtual image. In some embodiments, the detected information includes the image information. In some embodiments, the image information includes a plurality of spatially-resolved image brightness values. In some embodiments, the image information includes a global image brightness value.

In some embodiments, the method further includes determining multiple spatially-resolved dimming values for the portion of the system field of view based on the detected information. In some embodiments, the dimmer is adjusted according to the plurality of dimming values. In some embodiments, the dimmer comprises a plurality of pixels. In some embodiments, the dimmer is adjusted to completely block the intensity of the light associated with the world object in all of the system field of view. In some embodiments, the method further includes adjusting a brightness associated with the virtual image. In some embodiments, the virtual image is characterized by an image field of view. In some embodiments, the image field of view is equal to the system field of view. In some embodiments, the image field of view is a subset of the system field of view.

In general, in another aspect, the invention features an optical system. The optical system may include a projector configured to project a virtual image onto an eyepiece. The optical system may also include a dimmer configured to dim light associated with a world object. The optical system may further include a processor communicatively coupled to the projector and the dimmer. In some embodiments, the processor is configured to perform operations including determining a portion of a system field of view of the optical system to be at least partially dimmed based on detected information. In some embodiments, the operations may also include adjusting the dimmer to reduce an intensity of the light associated with the world object in the portion of the system field of view.

In some embodiments, the optical system further includes a light sensor configured to detect light information corresponding to the light associated with the world object. In some embodiments, the detected information includes the light information. In some embodiments, the light information includes a plurality of spatially-resolved light values. In some embodiments, the light information includes a global light value. In some embodiments, the optical system further includes an eye tracker configured to detect gaze information corresponding to an eye of a user of the optical system. In some embodiments, the detected information includes the gaze information. In some embodiments, the gaze information includes a pixel location that intersects with a gaze vector of the eye of the user. In some embodiments, the gaze information includes one or more of a pupil position of the eye of the user, a center of rotation of the eye of the user, a pupil size of the eye of the user, a pupil diameter of the eye of the user, and cone and rod locations of the eye of the user. In some embodiments, the operations further include detecting image information corresponding to the virtual image. In some embodiments, the detected information includes the image information. In some embodiments, the image information includes a plurality of spatially-resolved image brightness values. In some embodiments, the image information includes a global image brightness value.

In some embodiments, the operations further include determining multiple spatially-resolved dimming values for the portion of the system field of view based on the detected information. In some embodiments, the dimmer is adjusted according to the plurality of dimming values. In some embodiments, the dimmer comprises a plurality of pixels. In some embodiments, the dimmer is adjusted to completely block the intensity of the light associated with the world object in all of the system field of view. In some embodiments, the operations further include adjusting a brightness associated with the virtual image. In some embodiments, the virtual image is characterized by an image field of view. In some embodiments, the image field of view is equal to the system field of view. In some embodiments, the image field of view is a subset of the system field of view.

Numerous benefits can be achieved by way of the present disclosure over conventional techniques. For example, the AR device described herein may be used in varying light levels, from dark indoors to bright outdoors, by globally dimming and/or selectively dimming the ambient light reaching the user's eyes. Embodiments of the present invention allow for AR and virtual reality (VR) capabilities in a single device by using the pixelated dimmer to attenuate the world light by greater than 99%. Embodiments of the present invention also mitigate vergence accommodation conflict using a variable focal element with discrete or continuous variable depth plane switching technologies. Embodiments of the present invention improve the battery life of the AR device by optimizing the projector brightness based on the amount of detected ambient light. Other benefits will be readily apparent to those skilled in the art.

BRIEF DESCRIPTION OF THE DRAWINGS

FIG. 5 illustrates an AR device with an eyepiece and a pixelated dimming element.

FIG. 7A illustrates an example of a see-through display system in a first state.

FIG. 8A illustrates an example of another see-through display system in a first state.

FIG. 12 is a diagram of an example computer system useful with a see-through display system.

DETAILED DESCRIPTION

An ongoing technical challenge with optical see through (OST) augmented reality (AR) devices is the variation in the opacity and/or visibility of the virtual content under varying ambient light conditions. The problem worsens in extreme lighting conditions such as a completely dark room or outside in full bright sunlight. Embodiments disclosed herein can reduce (e.g., solve) these and other problems by dimming the world light at different spatial locations within the field of view of an AR device. In such variable dimming arrangements, the AR device can determine which a portion of the field of view to dim and the amount of dimming that is applied each portion based on various information detected by the AR device. This information may include detected ambient light, detected gaze information, and/or the detected brightness of the virtual content being projected. The functionality of the AR device can be further improved by detecting a direction associated with the ambient light by, for example, detecting spatially-resolved light intensity values. This can improve the AR device's battery life by dimming only those portions of the field of view in which dimming is needed and/or increasing the projector brightness in certain portions of the field of view. Accordingly, embodiments disclosed herein can enable usage of the AR device in a much wider variety of ambient lighting conditions than traditionally possible.

Figure 1:
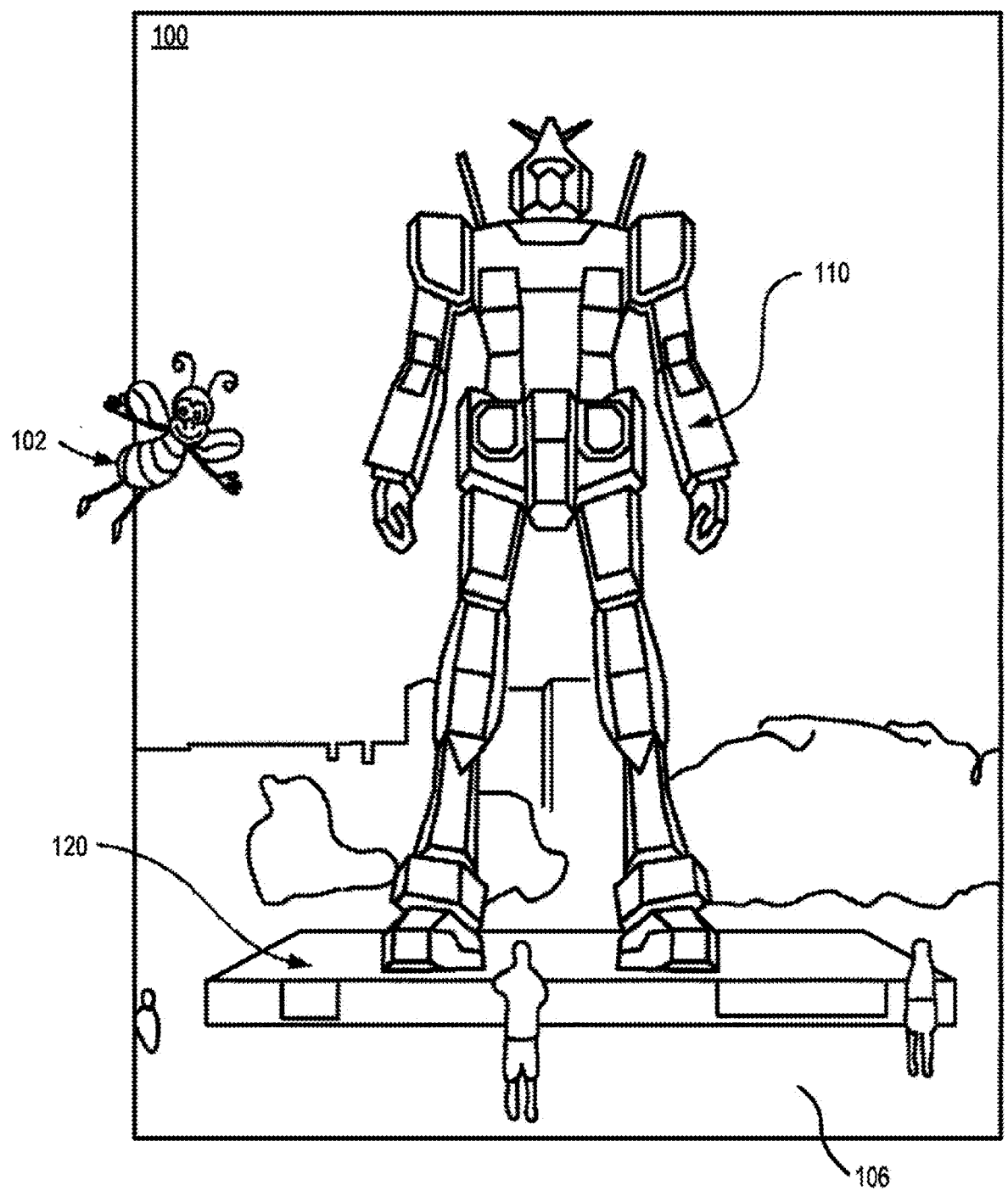
FIG. 1 illustrates an augmented reality (AR) scene as viewed through a wearable AR device according to some embodiments described herein.

FIG. 1 illustrates an AR scene as viewed through a wearable AR device according to some embodiments described herein. An AR scene 100 is depicted wherein a user of an AR technology sees a real-world park-like setting 106 featuring people, trees, buildings in the background, and a concrete platform 120. In addition to these items, the user of the AR technology also perceives that he "sees" a robot statue 110 standing upon the real-world platform 120, and a cartoon-like avatar character 102 flying by, which seems to be a personification of a bumble bee, even though these elements (character 102 and statue 110) do not exist in the real world. Due to the extreme complexity of the human visual perception and nervous system, it is challenging to produce a virtual reality (VR) or AR technology that facilitates a comfortable, natural-feeling, rich presentation of virtual image elements amongst other virtual or real-world imagery elements.

Figure 2A:
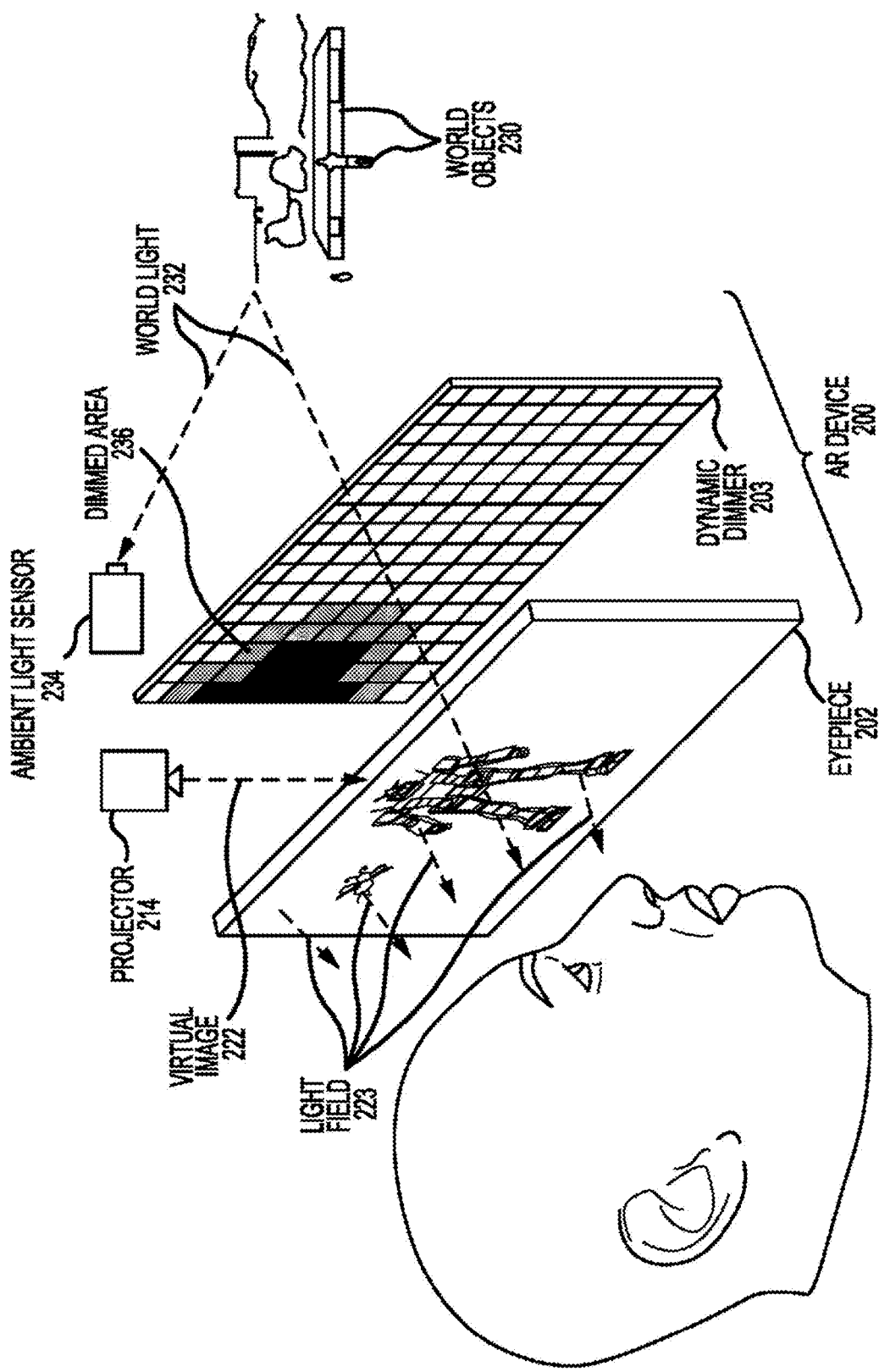
FIG. 2A illustrates one or more general features of an AR device according to the present invention.

FIG. 2A illustrates one or more general features of an example AR device 200. AR device 200 includes an eyepiece 202 and a dynamic dimmer 203 configured to be transparent or semi-transparent when AR device 200 is in an inactive mode or an off mode such that a user may view one or more world objects 230 when looking through eyepiece 202 and dynamic dimmer 203. As illustrated, eyepiece 202 and dynamic dimmer 203 are arranged in a side-by-side configuration and form a system field of view that a user sees when looking through eyepiece 202 and dynamic dimmer 203. In some embodiments, the system field of view is defined as the entire two-dimensional region occupied by one or both of eyepiece 202 and dynamic dimmer 203. Although FIG. 2A illustrates a single eyepiece 202 and a single dynamic dimmer 203 (for illustrative reasons), in general AR device 200 includes two eyepieces and two dynamic dimmers, one for each eye of a user.

During operation, dynamic dimmer 203 may be adjusted to vary an intensity of a world light 232 from world objects 230 transmitted to eyepiece 202 and the user, thereby providing a dimmed area 236 within the system field of view, which transmits less world light that the other areas of dynamic dimmer 203. Dimmed area 236 may be a portion or subset of the system field of view, and may be partially or completely dimmed. A partially dimmed area will transmit a fraction of incident world light, while a completely dimmed area will block substantially all incident world light. Dynamic dimmer 203 may be adjusted according to a plurality of spatially-resolved dimming values for dimmed area 236.

Furthermore, during operation of AR device 200, projector 214 may project a virtual image 222 onto eyepiece 202 which may be observed by the user along with world light 232. Projecting virtual image 222 onto eyepiece 202 projects a light field 223 (i.e., an angular representation of virtual content) onto the user's retina so that the user perceives the corresponding virtual content as being positioned at some location within the user's environment. It should be noted that the virtual content (character 102 and statue 110) is depicted in FIGS. 2A-2D as being displayed at eyepiece 202 for illustrative purposes only. The virtual content may actually be perceived by the user at various depths beyond eyepiece 202. For example, the user may perceive statue 110 as being located at approximately the same distance as world objects 230 (i.e., platform 120) and character 102 as being located closer to the user. In some embodiments, dynamic dimmer 203 may be positioned closer to the user than eyepiece 202 and may accordingly reduce an intensity of the light associated with virtual image 222 (i.e., light field 223). In some embodiments, two dynamic dimmers may be utilized, one on each side of eyepiece 202.

As depicted, AR device 200 includes an ambient light sensor 234 configured to detect world light 232. Ambient light sensor 234 may be positioned such that world light 232 detected by ambient light sensor 234 is similar to and/or representative of world light 232 that impinges on dynamic dimmer 203 and/or eyepiece 202. In some embodiments, ambient light sensor 234 may be configured to detect a plurality of spatially-resolved light values corresponding to different pixels of dynamic dimmer 203. In some embodiments, or in the same embodiments, ambient light sensor 234 may be configured to detect a global light value corresponding to an average light intensity or a single light intensity of world light 232. Other possibilities are contemplated.

Figure 2B:
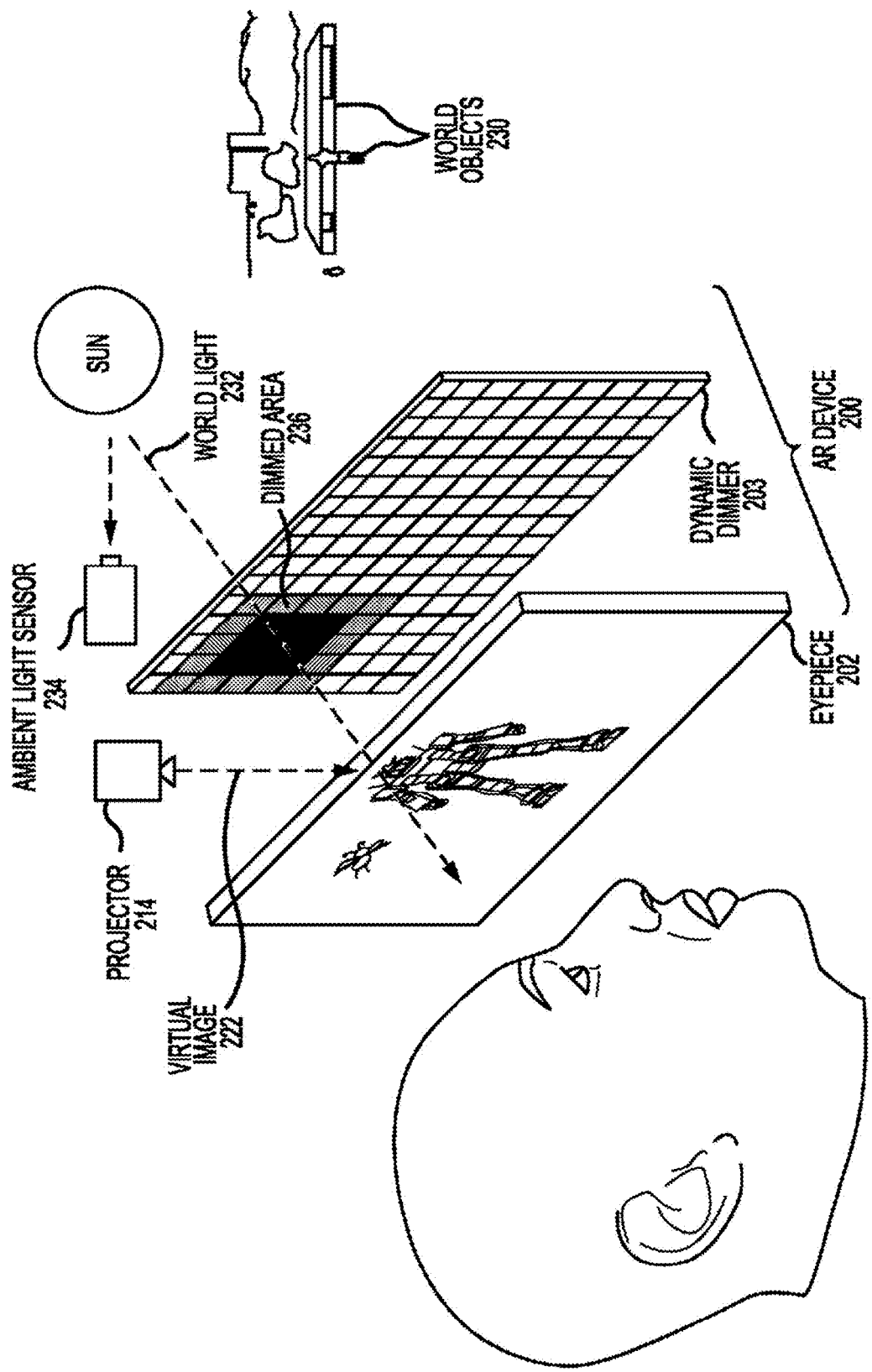
FIG. 2B illustrates an example of an AR device in which a dimmed area is determined based on detected light information.

FIG. 2B illustrates AR device 200 in a state in which dimmed area 236 is determined based on detected light information corresponding to world light 232. Specifically, ambient light sensor 234, in this example, detects world light 232 from the sun 233 and may further detect a direction and/or a portion of the system field of view at which world light 232 associated with the sun passes through AR device 200. In response, dynamic dimmer 203 is adjusted to set dimmed area 236 to cover a portion of the system field of view corresponding to the detected world light, reducing an intensity of world light from sun 233 to eyepiece 202 and the user. As illustrated, dynamic dimmer 203 is adjusted to reduce the transmitted intensity of world light 232 at the center of dimmed area 236 at a greater amount than the extremities of dimmed area 236.

Figure 2C:
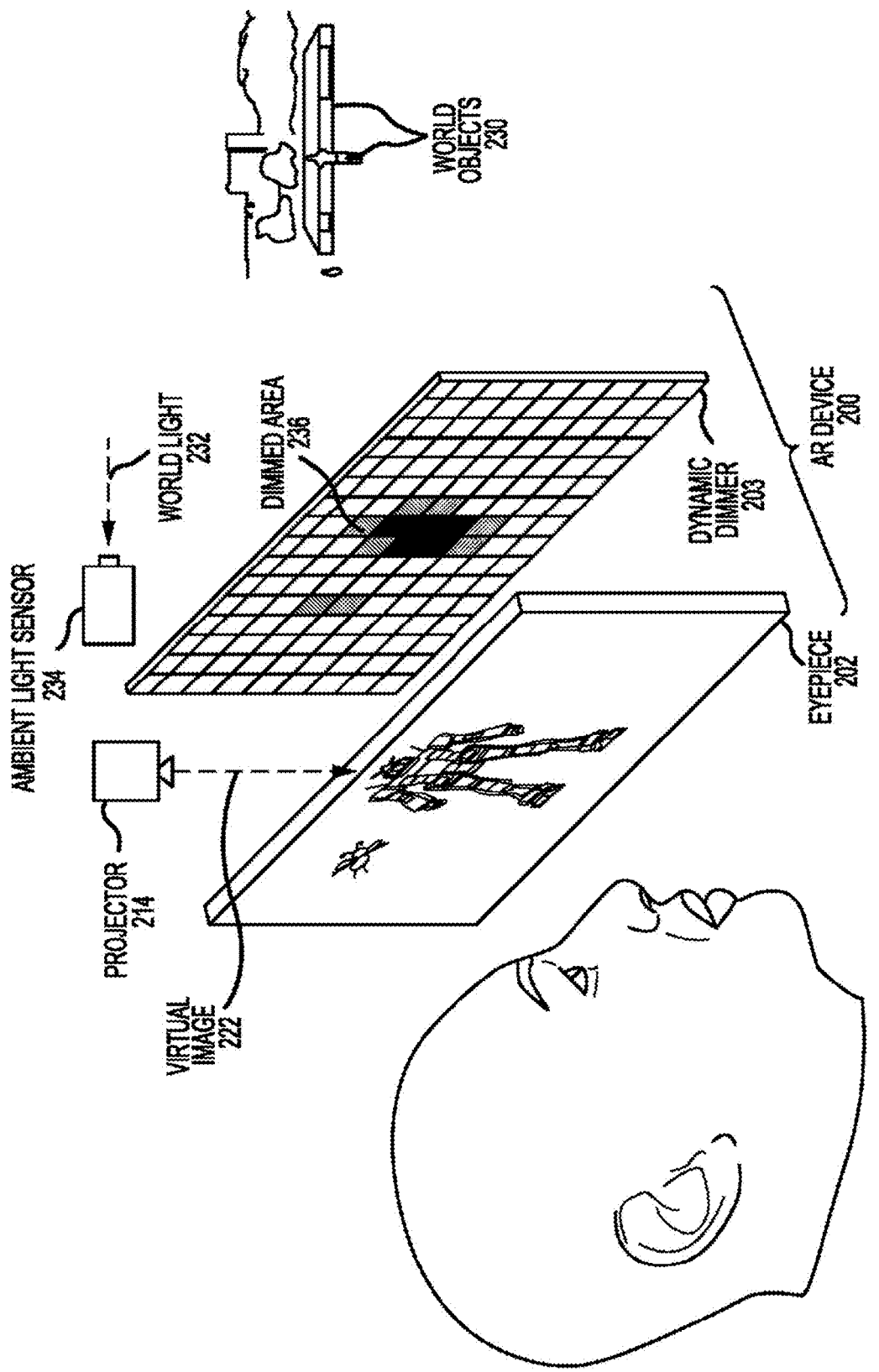
FIG. 2C illustrates an example of an AR device in which a dimmed area is determined based on a virtual image.

FIG. 2C illustrates AR device 200 in a state in which dimmed area 236 is determined based on the location of virtual image 222 in the field of view. Specifically, dimmed area 236 is determined based on the virtual content perceived by the user resulting from the user observing virtual image 222. In some embodiments, AR device 200 may detect image information that includes a location of virtual image 222 (e.g., a location within the system's field of view and/or the corresponding location of dynamic dimmer 203 through which the user perceives the virtual content) and/or a brightness of virtual image 222 (e.g., a brightness of the perceived virtual content), among other possibilities. As illustrated, dynamic dimmer 203 may be adjusted to set dimmed area 236 to cover a portion of the system field of view corresponding to virtual image 222 or, alternatively, in some embodiments dimmed area 236 may cover a portion of the system field of view that is not aligned with virtual image 222. In some embodiments, the dimming values of dimmed area 236 may be determined based on world light 232 detected by ambient light sensor 234 and/or the brightness of virtual image 222.

Figure 2D:
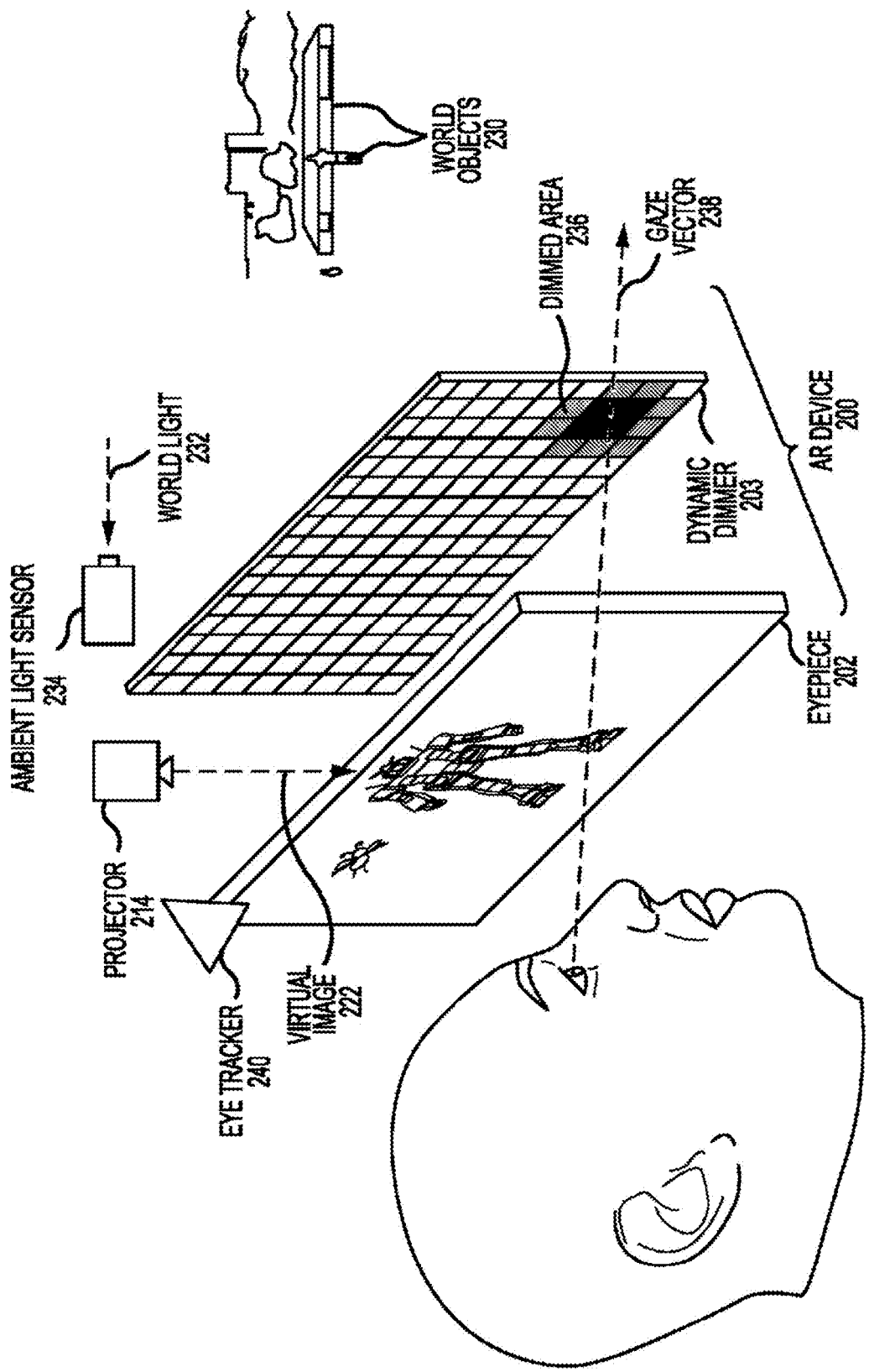
FIG. 2D illustrates an example of an AR device in which a dimmed area is determined based on gaze information.

FIG. 2D illustrates AR device 200 in a state in which dimmed area 236 is determined based on gaze information corresponding to an eye of a user. In some embodiments, the gaze information includes a gaze vector 238 of the user and/or a pixel location of dynamic dimmer 203 at which gaze vector 238 intersects with dynamic dimmer 203. As illustrated, dynamic dimmer 203 may be adjusted to set dimmed area 236 to cover a portion of the system field of view corresponding to an intersection point (or intersection region) between gaze vector 238 and dynamic dimmer 203 or, alternatively, in some embodiments dimmed area 236 may cover a portion of the system field of view that does not correspond to the intersection point (or intersection region) between gaze vector 238 and dynamic dimmer 203. In some embodiments, the dimming values of dimmed area 236 may be determined based on world light 232 detected by ambient light sensor 234 and/or the brightness of virtual image 222. In some embodiments, gaze information may be detected by an eye tracker 240 mounted to AR device 200.

Figure 3:
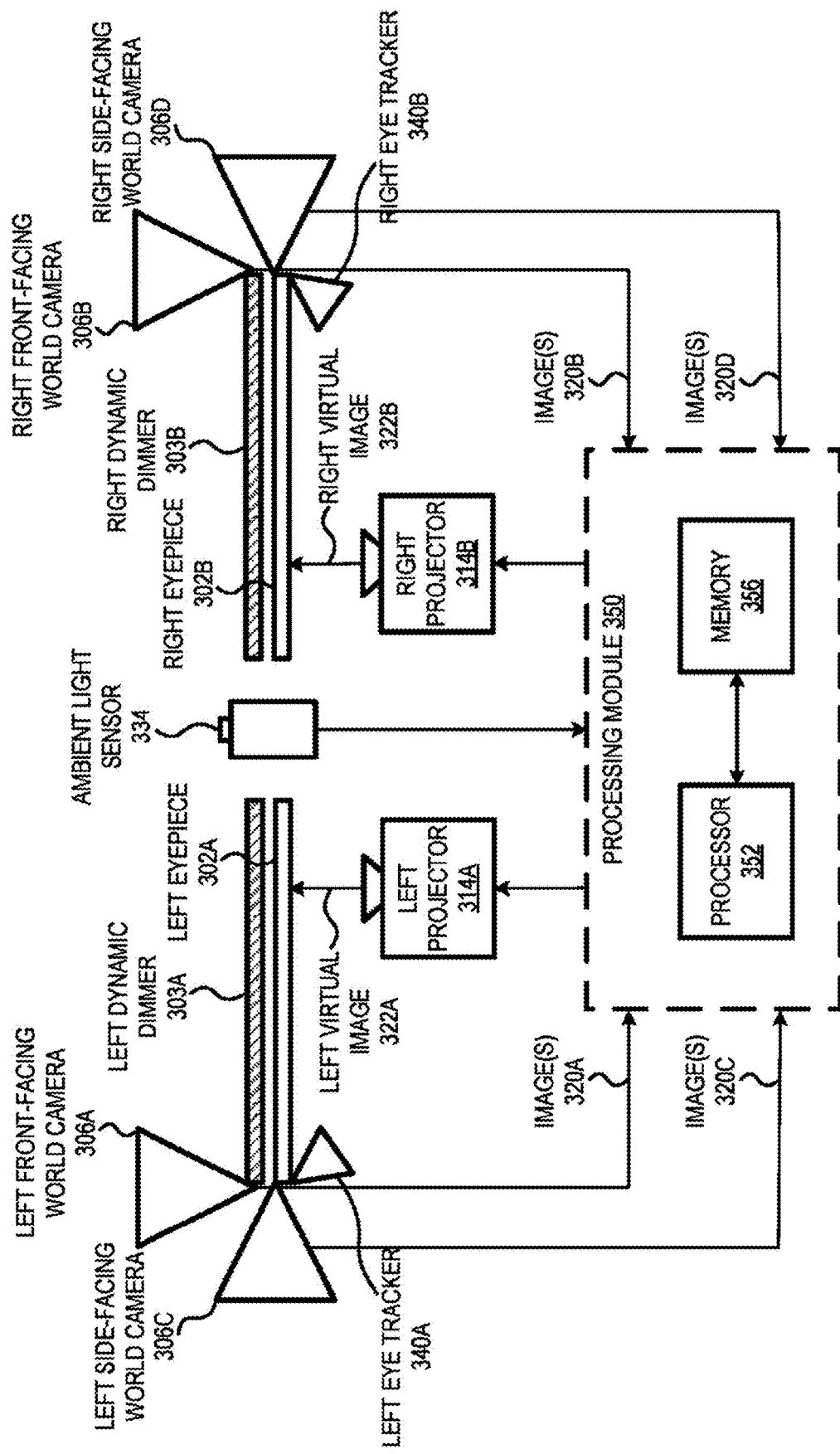
FIG. 3 illustrates a schematic view of a wearable AR device according to the present invention.

FIG. 3 illustrates a schematic view of a further example wearable AR device 300. AR device 300 includes a left eyepiece 302A and a left dynamic dimmer 303A arranged in a side-by-side configuration and a right eyepiece 302B and a right dynamic dimmer 303B also arranged in a side-by-side configuration. As depicted, AR device 300 includes one or more sensors including, but not limited to: a left front-facing world camera 306A attached directly to or near left eyepiece 302A, a right front-facing world camera 306B attached directly to or near right eyepiece 302B, a left side-facing world camera 306C attached directly to or near left eyepiece 302A, a right side-facing world camera 306D attached directly to or near right eyepiece 302B, a left eye tracker 340A positioned so as to observe a left eye of a user, a right eye tracker 340B positioned so as to observe a right eye of a user, and an ambient light sensor 334. AR device 300 also includes one or more image projection devices such as a left projector 314A optically linked to left eyepiece 302A and a right projector 314B optically linked to right eyepiece 302B.

Some or all of the components of AR device 300 may be head mounted such that projected images may be viewed by a user. In some implementations, all of the components of AR device 300 shown in FIG. 3 are mounted onto a single device (e.g., a single headset) wearable by a user. In certain implementations, a processing module 350 is physically separate from and communicatively coupled to the other components of AR device 300 by one or more wired and/or wireless connections. For example, processing module 350 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 350 may include a processor 352 and an associated digital memory 356, such as non-volatile memory (e.g., flash memory), both of which may be utilized to assist in the processing, caching, and storage of data. The data may include data captured from sensors (which may be, e.g., operatively coupled to AR device 300) or otherwise attached to a user, such as cameras 306, ambient light sensor 334, eye trackers 340, microphones, inertial measurement units, accelerometers, compasses, GPS units, radio devices, and/or gyros. For example, processing module 350 may receive image(s) 320 from cameras 306. Specifically, processing module 350 may receive left front image(s) 320A from left front-facing world camera 306A, right front image(s) 320B from right front-facing world camera 306B, left side image(s) 320C from left side-facing world camera 306C, and right side image(s) 320D from right side-facing world camera 306D. In some embodiments, image(s) 320 may include a single image, a pair of images, a video comprising a stream of images, a video comprising a stream of paired images, and the like. Image(s) 320 may be periodically generated and sent to processing module 350 while AR device 300 is powered on, or may be generated in response to an instruction sent by processing module 350 to one or more of the cameras. As another example, processing module 350 may receive light information from ambient light sensor 334. As another example, processing module 350 may receive gaze information from one or both of eye trackers 340. As another example, processing module 350 may receive image information (e.g., image brightness values) from one or both of projectors 314.

Eyepieces 302A and 302B may include transparent or semi-transparent waveguides configured to direct light from projectors 314A and 314B, respectively. Specifically, processing module 350 may cause left projector 314A to output a left virtual image 322A onto left eyepiece 302A (causing a corresponding light field associated with left virtual image 322A to be projected onto the user's retina), and may cause right projector 314B to output a right virtual image 322B onto right eyepiece 302B (causing a corresponding light field associated with right virtual image 322B to be projected onto the user's retina). In some embodiments, each of eyepieces 302 includes multiple waveguides corresponding to different colors and/or different depth planes. In some embodiments, dynamic dimmers 303 may be coupled to and/or integrated with eyepieces 302. For example, one of dynamic dimmers 303 may be incorporated into a multilayer eyepiece and may form one or more layers that make up one of eyepieces 302.

Cameras 306A and 306B may be positioned to capture images that substantially overlap with the field of view of a user's left and right eyes, respectively. Accordingly, placement of cameras 306 may be near a user's eyes but not so near as to obscure the user's field of view. Alternatively or additionally, cameras 306A and 306B may be positioned so as to align with the incoupling locations of virtual images 322A and 322B, respectively. Cameras 306C and 306D may be positioned to capture images to the side of a user, e.g., in a user's peripheral vision or outside the user's peripheral vision. Image(s) 320C and 320D captured using cameras 306C and 306D need not necessarily overlap with image(s) 320A and 320B captured using cameras 306A and 306B.

One or more components of AR device 300 may be similar to one or more components described in reference to FIGS. 2A-2D. For example, in the some embodiments the functionality of eyepieces 302, dynamic dimmers 303, projectors 314, ambient light sensor 334, and eye trackers 340 may be similar to eyepiece 202, dynamic dimmer 203, projector 214, ambient light sensor 234, and eye tracker 240, respectively. In some embodiments, the functionality of processing module 350 may be implemented by two or more sets of electronic hardware components that are housed separately but communicatively coupled. For example, the functionality of processing module 350 may be carried out by electronic hardware components housed within a headset in conjunction with electronic hardware components housed within a computing device physically tethered to the headset, one or more electronic devices within the environment of the headset (e.g., smart phones, computers, peripheral devices, smart appliances, etc.), one or more remotely-located computing devices (e.g., servers, cloud computing devices, etc.), or a combination thereof. One example of such a configuration is described in further detail below with reference to FIG. 12.

Figure 4:
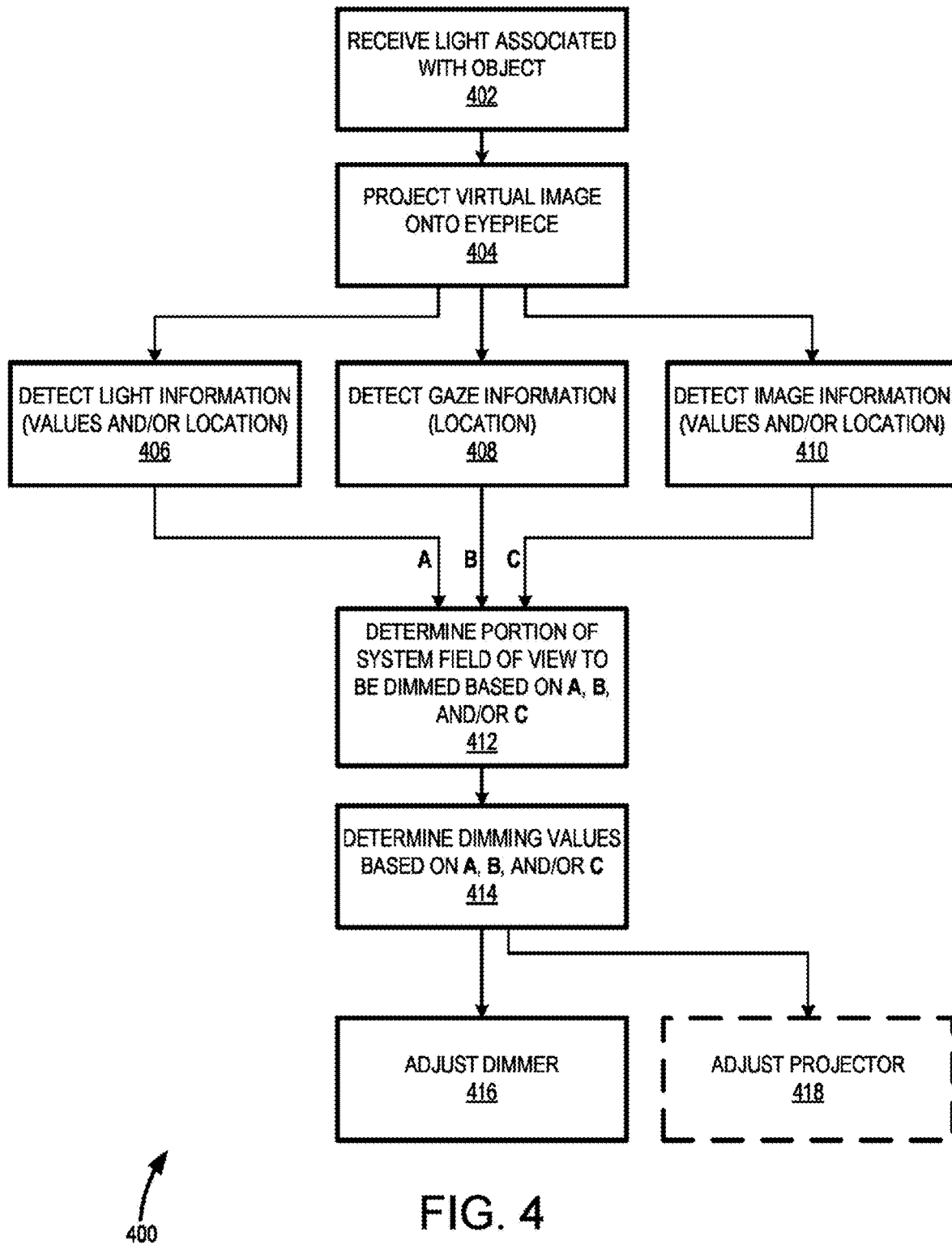
FIG. 4 illustrates a method for operating an optical system.

FIG. 4 illustrates an example method 400 for operating an optical system (e.g., AR device 200 or 300). Generally, operation of optical systems can include performing the steps of method 400 as shown in FIG. 4, or in a different order and not all of the steps need be performed. For example, in some embodiments, one or more of steps 406, 408, and 410 may be omitted during performance of method 400. One or more steps of method 400 may be performed by a processor (e.g., processor 352) or by some other component within the optical system.

At step 402, light (e.g., world light 232) associated with an object (e.g., world object 230) is received at the optical system. The object may be a real-world object, such as a tree, a person, a house, a building, the sun, etc., that is viewed by a user of the optical system. In some embodiments, the light associated with the object is first received by a dynamic dimmer (e.g., dynamic dimmer 203 or 303) or by an external cosmetic lens of the optical system. In some embodiments, the light associated with the object is considered to be received at the optical system when the light reaches one or more components of the optical system (e.g., when the light reaches the dynamic dimmer).

At step 404, a virtual image (e.g., virtual image 222 or 322) is projected onto an eyepiece (e.g., eyepiece 202 or 302). The virtual image may be projected onto the eyepiece by a projector (e.g., projector 214 or 314) of the optical system. The virtual image may be a single image, a pair of images, a video composed of a stream of images, a video composed of a stream of paired images, and the like. In some embodiments, the virtual image is considered to be projected onto the eyepiece when any light associated with the virtual image reaches the eyepiece. In some embodiments, projecting the virtual image onto the eyepiece causes a light field (i.e., an angular representation of virtual content) to be projected onto the user's retina in a manner such that the user perceives the corresponding virtual content as being positioned at some location within the user's environment.

During steps 406, 408, and 410, information may be detected by the optical system using, for example, one or more sensors of the optical system. At step 406, light information corresponding to the light associated with the object is detected. The light information may be detected using a light sensor (e.g., ambient light sensor 234 or 334) mounted to the optical system. In some embodiments, the light information includes a plurality of spatially-resolved light values. Each of the plurality of spatially-resolved light values may correspond to a two-dimensional position within the system field of view. For example, each of the light values may be associated with a pixel of the dynamic dimmer. In other embodiments, or in the same embodiments, the light information may include a global light value. The global light value may be associated with the entire system field of view (e.g., an average light value of light impinging on all pixels of the dynamic dimmer).

At step 408, gaze information corresponding to an eye of a user of the optical system is detected. The gaze information may be detected using an eye tracker (e.g., eye tracker 240 or 340) mounted to the optical system. In some embodiments, the gaze information includes a gaze vector (e.g., gaze vector 238) of the eye of the user. In some embodiments, the gaze information includes one or more of a pupil position of the eye of the user, a center of rotation of the eye of the user, a pupil size of the eye of the user, a pupil diameter of the eye of the user, and cone and rod locations of the eye of the user. The gaze vector may be determined based on one or more components of the gaze information, such as the pupil position, the center of rotation of the eye, the pupil size, the pupil diameter, and/or the cone and rod locations. When the gaze vector is determined based on the cone and rod locations, it may further be determined based on the light information (e.g., the global light value) so as to determine an origin of the gaze vector within a retinal layer of the eye containing the cone and rod locations. In some embodiments, the gaze information includes a pixel or group of pixels of the dynamic dimmer at which the gaze vector intersects with the dynamic dimmer.

At step 410, image information corresponding to a virtual image (e.g., virtual image 222 or 322) projected by the projector onto the eyepiece is detected. The image information may be detected by the projector, by a processor (e.g., processor 352), or by a separate light sensor. In some embodiments, the image information includes one or more locations within the dynamic dimmer through which the user perceives the virtual content when the user observes the virtual image. In some embodiments, the image information includes a plurality of spatially-resolved image brightness values (e.g., brightness of the perceived virtual content). For example, each of the image brightness values may be associated with a pixel of the eyepiece or of the dynamic dimmer. In one particular implementation, when the processor sends instructions to the projector to project the virtual image onto the eyepiece, the processor may determine, based on the instructions, the spatially-resolved image brightness values. In another particular implementation, when the projector receives the instructions from the processor to project the virtual image onto the eyepiece, the projector sends the spatially-resolved image brightness values to the processor. In another particular implementation, a light sensor positioned on or near the eyepiece detects and sends the spatially-resolved image brightness values to the processor. In other embodiments, or in the same embodiments, the image information includes a global image brightness value. The global image brightness value may be associated with the entire system field of view (e.g., an average image brightness value of the entire virtual image).

At step 412, a portion of the system field of view to be at least partially dimmed is determined based on the detected information. The detected information may include the light information detected during step 406, the gaze information detected during step 408, and/or the image information detected during step 410. In some embodiments, the portion of the system field of view is equal to the entire system field of view. In various embodiments, the portion of the system field of view may be equal to 1%, 5%, 10%, 25%, 50%, or 75%, etc., of the system field of view. In some embodiments, the different types of information may be weighted differently in determining the portion to be at least partially dimmed. For example, gaze information, when available, may be weighted more heavily in determining the portion to be at least partially dimmed than light information and image information. In one particular implementation, each type of information may independently be used to determine a different portion of the system field of view to be at least partially dimmed, and subsequently the different portions may be combined into a single portion using an AND or an OR operation.

At step 414, multiple spatially-resolved dimming values for the portion of the system field of view are determined based on the detected information. In some embodiments, the dimming values are determined using a formulaic approach based on a desired opacity or visibility of the virtual content. In one particular implementation, the visibility of the virtual content may be calculated using the following equation:

$$V = \frac{I_{max}\left(1 - \frac{1}{C}\right)}{I_{max}\left(1 + \frac{1}{C}\right) + 2I_{back}}$$

where V is the visibility, $I_{max}$ is the brightness of the virtual image as indicated by the image information, $I_{back}$ is related to a light value associated with the world object as indicated by the light information (which may be modified by the determined dimming value), and C is a desired contrast (e.g., 100:1). For example, the visibility equation may be used at each pixel location of the dimmer to calculate a dimming value for the particular pixel location using the brightness of the virtual image at the particular pixel location and the light value associated with the world object at the particular pixel location.

At step 416, the dimmer is adjusted to reduce an intensity of the light associated with the object in the portion of the system field of view. For example, the dimmer may be adjusted such that the intensity of the light associated with the object impinging on each pixel location of the dimmer is reduced according to the dimming value determined for that particular pixel location. As used in the present disclosure, adjusting the dimmer may include initializing the dimmer, activating the dimmer, powering on the dimmer, modifying or changing a previously initialized, activated, and/or powered on dimmer, and the like. In some embodiments, the processor may send data to the dimmer indicating both the portion of the system field of view and the plurality of spatially-resolved dimming values.

At step 418, the projector is adjusted to adjust a brightness associated with the virtual image. For example, in some embodiments it may be difficult to achieve a desired opacity or visibility of the virtual content without increasing or decreasing the brightness of the virtual object. In such embodiments, the brightness of the virtual image may be adjusted before, after, simultaneously, or concurrently with adjusting the dimmer.

FIG. 5 illustrates an AR device 500 with an eyepiece 502 and a pixelated dimming element 503 composed of a spatial grid of dimming areas (i.e., pixels) that can have various levels of dimming independent of each other (i.e., they are independently variable). Each of the dimming areas may have an associated size (e.g., width and height) and an associated spacing (e.g., pitch). As illustrated, the spatial grid of dimming areas may include one or more dark pixels 506 providing complete dimming of incident light and one or more clear pixels 508 providing complete transmission of incident light. Adjacent pixels within pixelated dimming element 503 may be bordering (e.g., when the pitch is equal to the width) or may be separated by gaps or channels (e.g., when the pitch is greater than the width).

In various embodiments, pixelated dimming element 503 uses liquid crystal technology. Such technology typically includes a layer of a liquid crystal material (e.g., having a nematic phase) aligned relative to one or more electrode layers so that the liquid crystal material can be reoriented depending on an electric field strength applied to the pixel (e.g., by applying a potential difference across the liquid crystal layer using electrodes on opposing sides of the liquid crystal layer). Examples of liquid crystal modes include twisted nematic ("TN") or vertically aligned ("VA") liquid crystals. Electrically controlled birefringence ("ECB") liquid crystal modes can also be used. Liquid crystal phases other than nematic phases can be used, such as, ferroelectric liquid crystals. In some embodiments, dye doped or guest-host liquid crystal materials can be used.

Figure 6A:
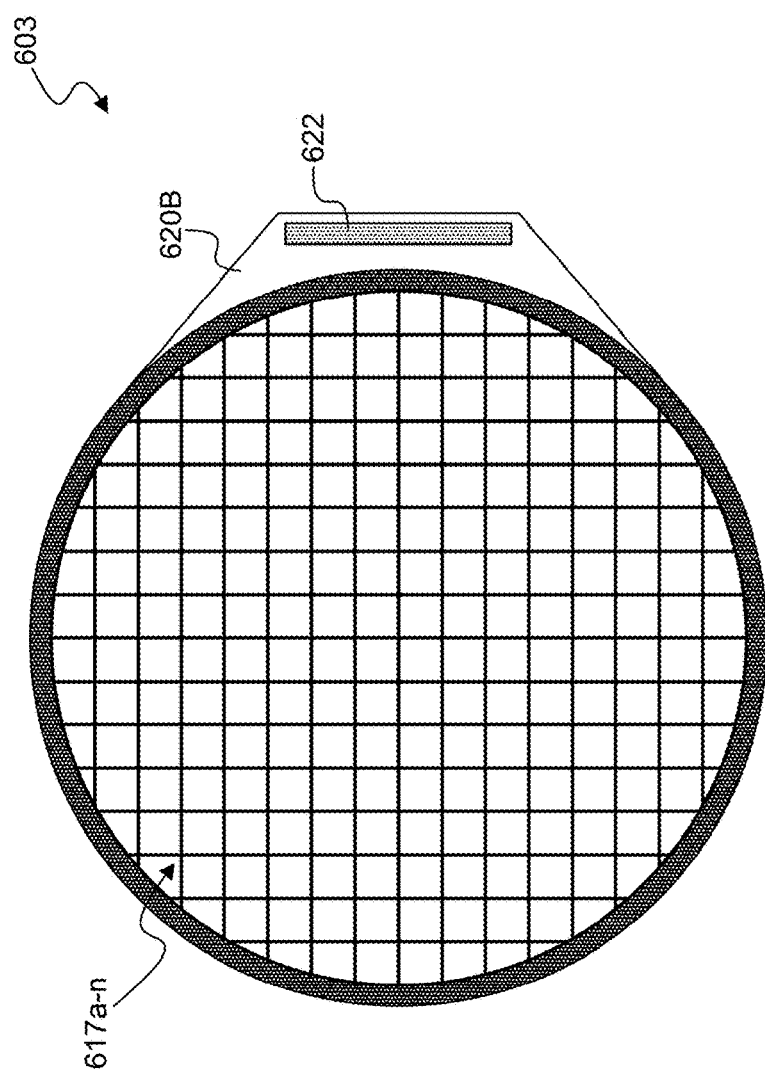
FIG. 6A is a front view of an example optically-transmissive spatial light modulator ("SLM") or display assembly for a see-through display system, according to some embodiments of the present disclosure.
Figure 6B:
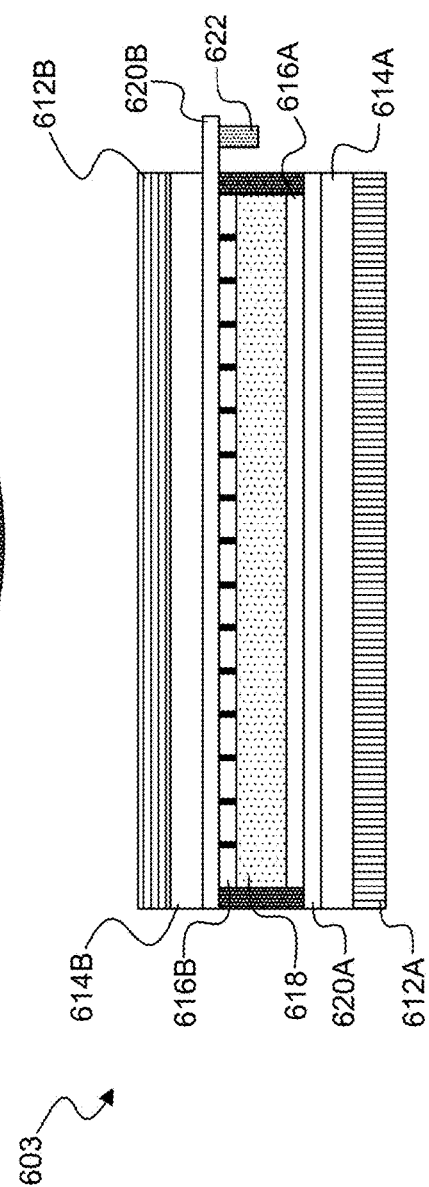
FIG. 6B is a schematic side view of the example SLM or display assembly of FIG. 6A.

FIG. 6A depicts a front view of an example optically-transmissive spatial light modulator ("SLM") or display assembly 603 for a see-through display system. Similarly, FIG. 6B depicts a schematic cross-sectional view of the example SLM or display assembly of FIG. 6A. In some examples, the optically-transmissive SLM or display assembly 603 may form all or part of an external cover of an augmented reality system. The assembly 603 may, for example, correspond to an optically-transmissive controllable dimming assembly that is similar or equivalent to one or more of the dimming assemblies described herein, an optically-transmissive LCD, an optically-transmissive OLED display, and the like. In some implementations, the assembly 603 of FIGS. 6A-6B may correspond to one or more of components 203, 303a, 303B, and 503 as described above with reference to FIGS. 2A-2C, 3, and 5, respectively. Additional examples of controllable dimming assembly architectures and control schemes are described in further detail in U.S. Provisional Patent Application Ser. No. 62/725,993, U.S. Provisional Patent Application Ser. No. 62/731,755, U.S. Provisional Patent Application Ser. No. 62/858,252, and U.S. Provisional Patent Application Ser. No. 62/870,896, all of which are incorporated herein by reference in their entirety.

In the example of FIGS. 6A-6B, the assembly 603 includes a liquid crystal layer 618 sandwiched between an outer electrode layer 616A and an inner electrode layer 616B, which are in turn sandwiched between an outer polarizer 612A and an inner polarizer 612B. The outer and inner polarizers 612A, 612B may be configured to linearly polarize unpolarized light that passes therethrough. The assembly 603 includes an outer substrate layer 620A positioned between the outer polarizer 612A and the outer electrode layer 616A, an inner substrate layer 620B positioned between the inner polarizer 612B and the inner electrode layer 616B. Substrate layers 620A and 620B support electrode layers 616A and 616B and are typically formed from an optically transparent material, such as a glass or plastic. The assembly 603 further includes an outer optical retarder 614A (e.g., an A-plate) positioned between the outer polarizer 612A and the outer electrode layer 616A, an inner optical retarder 614B (e.g., an A-plate) positioned between the inner polarizer 612B and the inner electrode layer 616B.

As mentioned above, in some implementations, the assembly 803 may include or correspond to an ECB cell. Advantageously, ECB cells can be configured to modulate circularly polarized light, e.g., to change the ellipticity of the circularly polarized light, for example.

In operation, the outer polarizer 612A imparts a first polarization state (e.g., linear polarization along the vertical direction of FIG. 6A) to ambient light propagating therethrough toward a user's eye. Next, depending on their orientation, liquid crystal molecules contained within the liquid crystal layer 618 further rotate/retard the polarized ambient light as it traverses the liquid crystal layer 618. For example, liquid crystal layer 618 can rotate the linearly polarized light so that the plane of polarization is different from the plane of polarization of the first polarization state. Alternatively, or additionally, the liquid crystal layer can retard the polarization, e.g., transforming linearly polarized light into elliptically or circularly polarized light. Generally, the amount of rotation/retardation depends on the birefringence of the liquid crystal material, its orientation, and the thickness of liquid crystal layer 618. The amount of rotation/retardation also depends on the electric field applied to liquid crystal layer 618, e.g., by applying a potential difference across outer and inner electrode layers 616A, 616B. It follows that the amount of polarization rotation imparted by the pair of electrode layers 616A, 616B and liquid crystal layer 618 may be varied on a pixel-by-pixel basis according to the voltage applied to the electrode layers at each respective pixels.

Retardation of the polarized light is also influenced by the outer and inner optical retarders 614A, 614B. For example, use of a quarter wave plate as outer optical retarder 614A will serve to retard the linearly polarized light transmitted by polarizer 612A to transform the linearly polarized light to circularly polarized light where the fast axis of the quarter wave plate is appropriately oriented with respect to the pass axis of the linear polarizer (e.g., at 45°).

Lastly, the inner polarizer 612B may transmit light of a second, different polarization state (e.g., horizontal polarization) compared to outer polarizer 612A. The second polarization state may be orthogonal to the polarization state imparted on the ambient light by outer polarizer 612A. In such circumstances, where the cumulative effect of the liquid crystal layer 618, and the outer and/or inner optical retarders 614A, 614B rotates polarized light transmitted by outer polarizer 612A, inner polarizer 612B will transmit the light transmitted by outer polarizer 612A, albeit rotated by 90 degrees. Alternatively, where the cumulative effect of liquid crystal layer 618 and the optical retarders 614A and 614B leaves the polarization state of light from polarizer 612A unchanged, it will be blocked by inner polarizer 612B. Accordingly, the inner polarizer 612B may allow portions of ambient light in the second polarization state to pass therethrough unaffected, and may attenuate portions of ambient light in polarization states other than the second polarization state. The amount of polarization rotation can be controlled on a pixel-by-pixel basis by the electric field strength applied to the liquid crystal layer at each pixel, allowing light transmission of device 603 to be controlled on a pixel-by-pixel basis.

Generally, the pixel structure of the electrode layers can vary depending, e.g., on the nature of the liquid crystal layer, the pixel size, etc. In some embodiments, one of the outer electrode layer 616A and the inner electrode layer 616B may correspond to a layer of individually-addressable electrodes (i.e., pixels) arranged in a two-dimensional array. For instance, in some examples, the inner electrode layer 616B may correspond to an array of pixel electrodes that may each be selectively controlled by the assembly 603 to generate a respective electric field/voltage in tandem with the outer electrode layer 616A, which may correspond to a single planar electrode. In some examples, the electrodes of one or both of the outer and inner electrode layers 616A, 616B may be made out of an optically-transmissive conducting material, such as indium tin oxide ("ITO").

As shown in FIGS. 6A-6B, the assembly 603 also includes metal line traces or conductors 617a-n. Each pixel electrode in the array of pixel electrodes of the assembly 603 is electrically coupled to a corresponding thin film transistor ("TFT"), which in turn is electrically coupled to a corresponding pair of metal line traces or conductors in the plurality of metal line traces or conductors 617a-n. Such metal line traces or conductors are positioned in "transmissive gap" regions between pixels (e.g., pixel electrodes of the inner electrode layer 616B), and are further electrically coupled to one or more circuits for driving or otherwise controlling the state of each pixel. In some examples, such one or more circuits may include a chip on glass ("COG") component 622. The COG component 622 may be disposed upon a layer of glass in the assembly 603, such as the inner glass layer 620B. In some implementations, the COG component 622 may be laterally offset from the array of pixels (e.g., array of pixel electrodes of the inner electrode layer 616B). In this way, the COG component 622 of the assembly 603 may be positioned outside of a user's field of view ("FOV"), obscured by housing or other components of the see-through display system, or a combination thereof. Pixels that use active switching elements such as TFTs are referred to as being actively addressed.

Figure 7B:
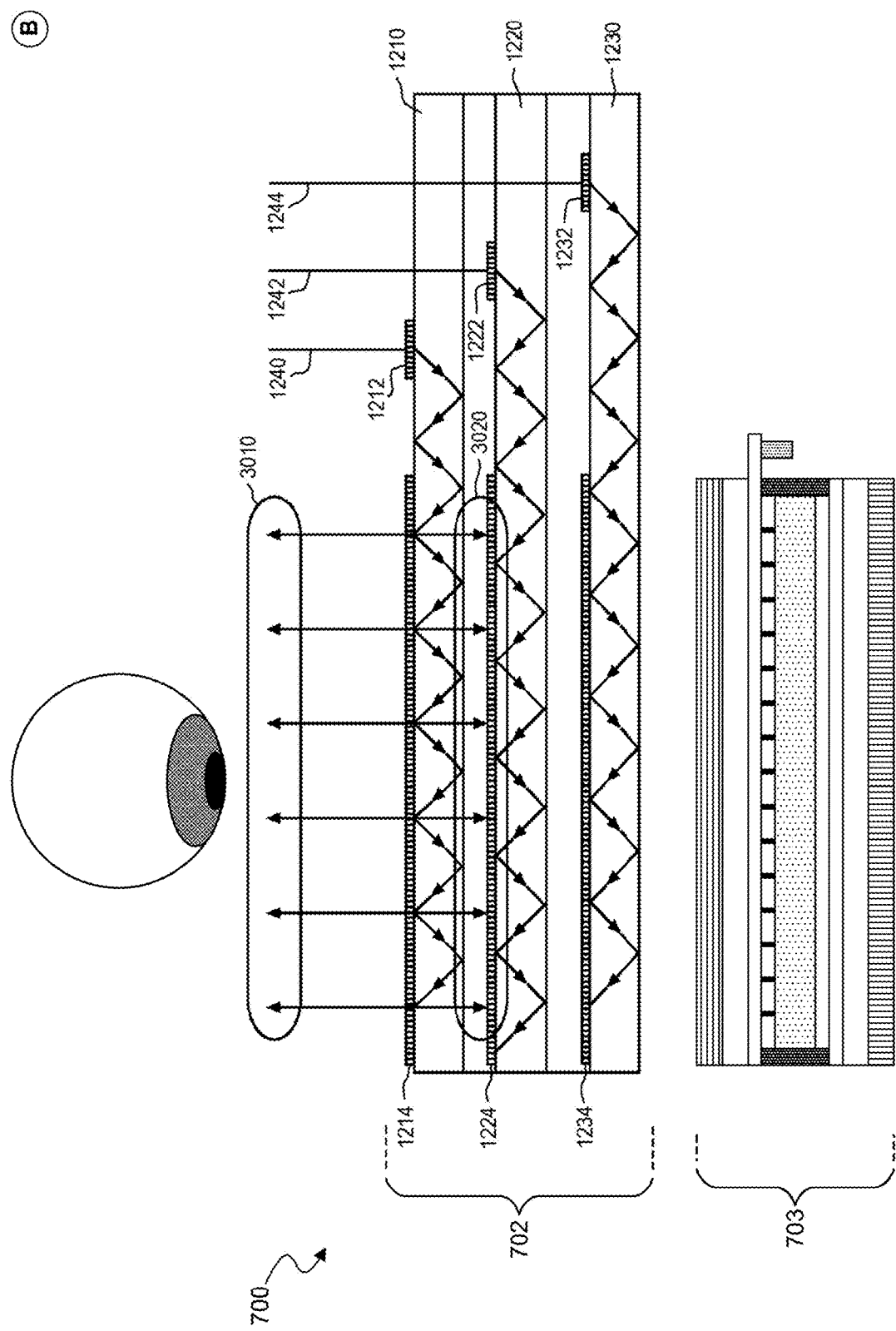
FIG. 7B illustrates an example of the see-through display system of FIG. 7A in a second state different from the first state.

FIG. 7A illustrates an example of a see-through display system 700 in a first state (state "A"). Similarly, FIG. 7B illustrates the see-through display system 700 in a second state (state "B") that is different from the first state (state "A"). As shown in FIGS. 7A-7B, the system 700 includes an eyepiece 702 and an optically-transmissive SLM or display assembly 703. In some examples, the eyepiece 702 of FIGS. 7A-7B corresponds to one or more of components 202, 302A, 302B, and 502 as described above with reference to FIGS. 2A-2C, 3, and 5, respectively. In some implementations, the assembly 703 of FIGS. 7A-7B may correspond to one or more of components 203, 303a, 303B, 503, and 603 as described above with reference to FIGS. 2A-2C, 3, 5, and 6A-6B respectively.

The eyepiece 702 of the system 700 includes three waveguides 1210, 1220, and 1230. Each of the three waveguides 1210, 1220, and 1230 may, for example, correspond to a different color of light and/or depth of virtual content. As shown in FIGS. 7A-7B, the eyepiece 702 further includes incoupling optical elements 1212, 1222, and 1232 disposed upon waveguides 1210, 1220, and 1230, respectively. The incoupling optical elements 1212, 1222, and 1232 may be configured to couple light into waveguides 1210, 1220, and 1230, respectively, for propagation via total internal reflection (TIR). In addition, the eyepiece 702 also includes outcoupling diffractive optical elements 1214, 1224, and 1234 disposed upon waveguides 1210, 1220, and 1230, respectively. The outcoupling diffractive optical elements 1214, 1224, and 1234 may be configured to couple light out of waveguides 1210, 1220, and 1230, respectively, toward one or both eyes of a viewer of the system 700. As can be seen in FIG. 7A, in the first state (state "A"), no light is coupled into or out of the eyepiece 702.

In the example of FIG. 7B, the system 700 is in a second, different state (state "B") in which light is (i) coupled into the waveguides 1210, 1220, and 1230 by way of the incoupling optical elements 1212, 1222, and 1232, (ii) propagating through the waveguides 1210, 1220, and 1230 via total internal reflection (TIR), and (iii) coupled out of the waveguides 1210, 1220, and 1230 by way of the outcoupling diffractive optical elements 1214, 1224, and 1234. As each light path 1240, 1242 and 1244 respectively incouples at locations 1212, 1222, and 1232 impact a respective outcoupling diffractive optical element 1214, 1224, or 1234 (outcoupled light from paths 1222 and 1232 not depicted) disposed upon waveguide 1210, 1220, and 1230, it diffracts light both towards the viewer and away from the viewer, towards the world side of the device. This light propagation is depicted as multiple beamlets each propagating in two opposite directions: one towards the viewer represented by light bundle 3010, and one in a direction away from the viewer represented by light bundle 3020.

The light bundle 3020 propagating away from the viewer may cause undesirable effects if it reflects off elements of the system in its path because these reflections can reach the viewer as stray light. For example, reflections of this light from the subsequent waveguide 1220 can interfere with light bundle 3010, increasing blurriness and/or reducing contrast of imagery projected by system 700. Furthermore, in some situations, the light bundle 3020 may reflect off of one or more components of the assembly 703, such as one or more metal line traces or conductors of the assembly 703 that are equivalent or similar to the metal line traces or conductors 617a-n of the assembly 603 as described above with reference to FIGS. 6A-6B, which may produce "ghost" images and other undesirable artifacts. Waveguide optical systems that employ pupil expander technology can further aggravate these problems.

Figure 8B:
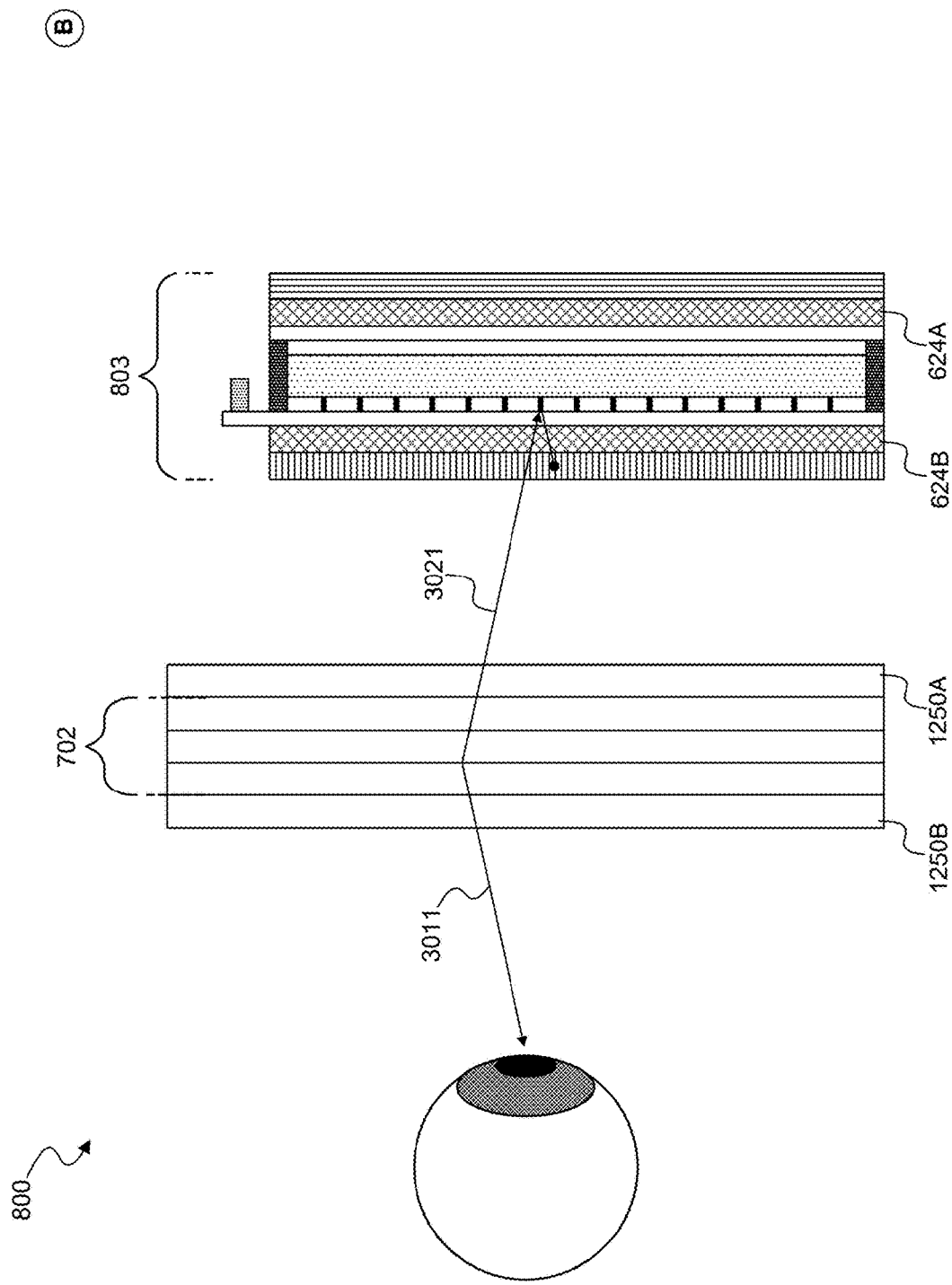
FIG. 8B illustrates an example of the see-through display system of FIG. 8A in a second state different from the first state.

FIGS. 8A and 8B respectively illustrate an example of a see-through display system 800 in a first state (state "A") and a second state (state "B") that is different from the first state (state "A"). As shown in FIGS. 8A-8B, the system 800 includes eyepiece 702 and an optically-transmissive SLM 803. In some examples, the eyepiece 702 of FIGS. 8A-8B may correspond to the eyepiece 702 of FIGS. 7A-7B, but may further include an outer glass cover 1250A and an inner glass cover 1250B positioned on either side of the waveguide stack.

In some implementations, the assembly 803 of FIGS. 8A-8B may correspond to one or more of assemblies 603 and 703 as described above with reference to FIGS. 6A-6B and 7A-7B, respectively, but where the inner and outer optical retarders 614A and 614B are quarter wave plates (QWP) 624A and 624B, respectively. The outer and inner QWPs 624A, 624B serve to convert linearly polarized light passing therethrough into circularly polarized light. For example, light propagating from the viewer's environment toward the viewer can be linearly polarized as it passes through the outer polarizer 612A, and subsequently become circularly polarized as it passes through the outer QWP 624A. Similarly, light propagating away from the viewer and toward the assembly 803, such as one or more portions of light bundle 3020, may become linearly polarized as it passes through the inner polarizer 612B, and subsequently become circularly polarized as it passes through the inner QWP 624B. As can be seen in FIG. 8A, in the first state (state "A"), no light is coupled into or out of the eyepiece 702.

In the example of FIG. 8B, the system 800 is in a second, different state (state "B") in which light is coupled out of the eyepiece 702 in two directions: one towards the viewer represented by light ray 3011, and one in a direction away from the viewer represented by light ray 3021. Light rays 3011 and 3021 may represent portions of light bundles similar to light bundles 3010 and 3020 as described above with reference to FIG. 7B. As shown in FIG. 8B, as the light ray 3021 propagates away from the eyepiece 702 and toward the assembly 803, the light ray 3021 is linearly polarized as it passes through the inner polarizer 612B, and subsequently become circularly polarized as it passes through the inner QWP 624B. Upon reaching one or more metal line traces or conductors of the assembly 803, the light ray 3021 may reflect back toward the eyepiece 702, which may effectively reverse the handedness of the circular polarization of the light ray 3021 (i.e., left-handed circularly polarized light becomes right-handed circularly polarized light up reflection, and vice versa). Passing through the inner QWP 624B on its way back toward the eyepiece 702, the circularly polarized light is converted back to linearly polarized light, but polarized orthogonal to the pass state of polarizer 612B. Accordingly, the reflected light is attenuated (e.g., blocked) by polarizer 612B. In this way, the system 800 reduces the effects of "ghost" images that may be produced as a result of light from the eyepiece 702 reflecting off of components of the assembly 803 and back toward the viewer.

In some embodiments, the inner optical retarder 614A is a quarter wave plate and the outer optical retarder 614B is an A-plate (e.g., a uniaxial birefringent film with fast axis in the plane of the plate) with a retardation that is slightly different from quarter wave retardation. For example, in some implementations, the liquid crystal can retain some residual birefringence even in its state of lowest birefringence. This can occur, for instance, due to the orientation of liquid crystal molecules close to alignment layers within a liquid crystal layer. At and close to the alignment layer, the liquid crystal molecules can retain their alignment even in the presence of maximum electric field strength applied by the electrode structure. It is possible to compensate for such residual retardation of the liquid crystal material by increasing a retardation of the outer optical retarder 614B above quarter wave retardation. For example, the outer optical retarder 614B can be an A-plate with a retardation that is 5 nm or more greater than quarter wave retardation (e.g., 10 nm or more, 15 nm or more, 20 nm or more, 25 nm or more, 30 nm or more, 35 nm or more, 40 nm or more, 45 nm or more, such as up to 50 nm). Compensating for residual retardation of the liquid crystal layer can reduce light leakage through the dynamic dimmer.

The fast axes of the inner and outer optical retarders are generally arranged relative to the alignment directions of the liquid crystal layer and the pass axes of the inner and outer polarizers so that the dynamic dimmer provides a large dynamic range with good light extinction in its darkest state. In some embodiments, the inner and outer optical retarders have their fast axes oriented at 45° relative to the pass axes of their adjacent polarizer. The fast axes of the inner and outer optical retarders can be oriented at 90° with respect to each other. In certain embodiments, the fast axis of the outer optical retarder is oriented at 90° with respect to an alignment direction of the liquid crystal layer at the world-side boundary of the liquid crystal layer.

Generally, the performance of the dynamic dimmer is optimized for at least one light propagation direction at at least one wavelength. For example, the dynamic dimmer's performance can be optimized for "on-axis" light, i.e., light that is incident normal to the layers of the stack forming the dynamic dimmer. In certain embodiments, the performance of the dynamic dimmer is optimized for green light, e.g., light with a wavelength of 550 nm. Furthermore, while the performance of the dynamic dimmer may be optimal for one wavelength along one light propagation direction, in general, the dimmer will be configured to provide adequate performance over a range of angles and a range of wavelengths. For example, the dynamic dimmer can be configured to provide adequate performance (e.g., a dynamic range above a minimum performance threshold) over a range of light propagation angles the same size or larger than the field of view of the display. Furthermore, the performance can be adequate over a range of operative wavelengths (e.g., spanning the color gamut of the display). To achieve adequate performance over a range of wavelengths, in some implementations, achromatic optical components, such as achromatic optical retarders, can be used. Achromatic A-plates (e.g., achromatic quarter wave plates) can be provided by using two or more different birefringent materials that have different dispersions, for instance.

Figure 9:
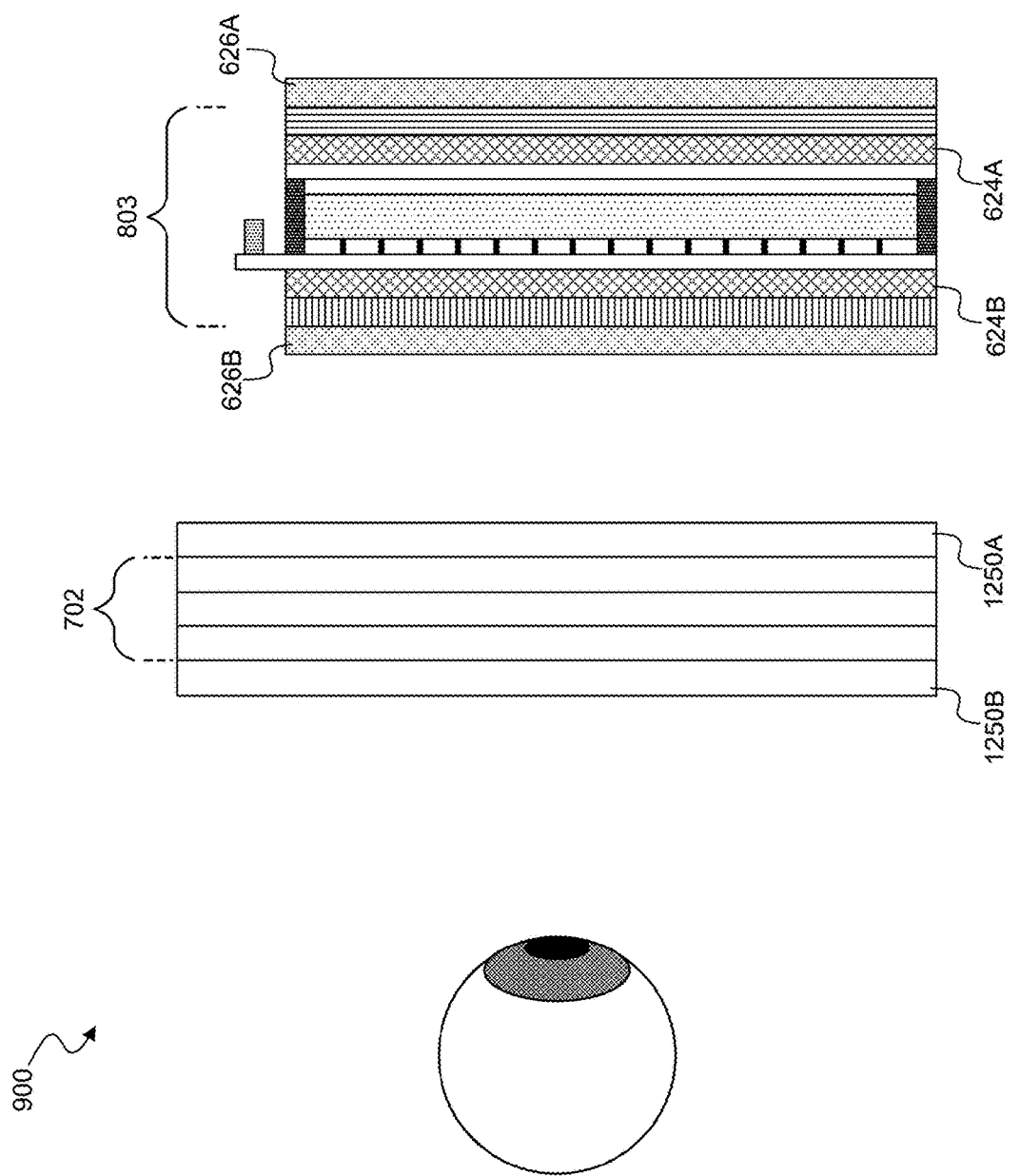
FIG. 9 illustrates an example of a see-through display system according to some embodiments of the present disclosure.

FIG. 9 illustrates a further example of a see-through display system 900. The system 900 of FIG. 9 may correspond to the system 800 of FIGS. 8A-8B, but may further include an outer anti-reflective layer 626A and an inner anti-reflective layer 626B. The outer anti-reflective layer 626A may be positioned adjacent the outer polarizer 612A, while the inner anti-reflective layer 626B may be positioned adjacent the inner polarizer 612B. The outer and inner anti-reflective layers 626A, 626B may serve to further reduce the presence undesirable effects, such as "ghost" images, by limiting the reflection of light from coupled out of the eyepiece 702. In some situations, at least some such reflections may be a result of refractive index mismatches between different layers of display system 900 or between air and a layer of display system 900 (i.e., Fresnel reflections). Anti-reflective layers can reduce such reflections. A variety of different appropriate anti-reflective layers can be used, including single layer or multi-layer anti-reflective films. Such layers can be optimized for on axis light or for light at some other non-normal angle of incidence. Such layers can be optimized for one or more visible wavelengths. In some embodiments, the anti-reflective layers are optimized for light having a wavelength in the green portion of the visible spectrum, e.g., at or near the maximum photopic sensitivity of the human eye. Examples of anti-reflective layers for use in eyepieces are described in U.S. patent application Ser. No. 16/214,575, filed on Dec. 10, 2018, published on Jun. 13, 2019 as U.S. Publication No. 2019/0179057, which is expressly incorporated by reference herein in its entirety.

Figure 10:
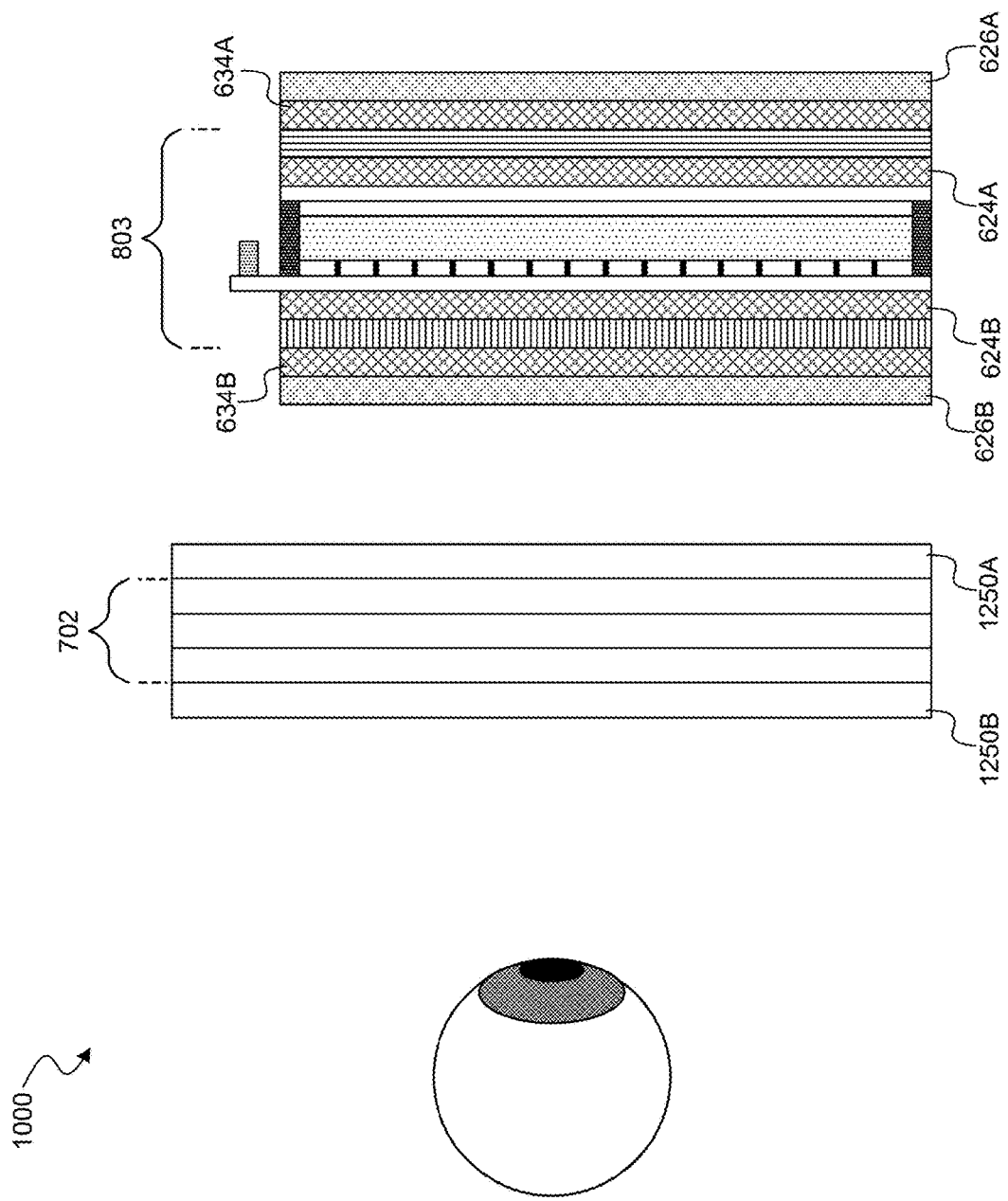
FIG. 10 illustrates an example of a see-through display system according to other embodiments of the present disclosure.

FIG. 10 illustrates yet another example of a see-through display system 1000. The system 1000 of FIG. 10 may correspond to the system 900 of FIG. 9, but may further include a second outer QWP 634A and a second inner QWP 634B. The second outer QWP 634A is positioned adjacent the outer polarizer 612A, while the second inner QWP 634B is positioned adjacent the inner polarizer 612B. The second QWP 634A may serve to further reduce the presence undesirable effects, such as "ghost" images, by modulating the polarization state of light traveling away from the viewer and having passed through the outer polarizer 612A, such that said light is attenuated by the outer polarizer 612A in the event that it reflects off of one or more objects in the vicinity of the system 1000 (e.g., beyond the assembly 803). Similarly, the inner QWP 634B may serve to further reduce the presence undesirable effects, such as "ghost" images, by modulating the polarization state of light traveling toward the viewer and having passed through the inner polarizer 612B, such that said light is attenuated by the inner polarizer 612A in the event that it reflects off of one or more components of the system 1000 positioned between the inner polarizer 612B and the viewer.

Figure 11:
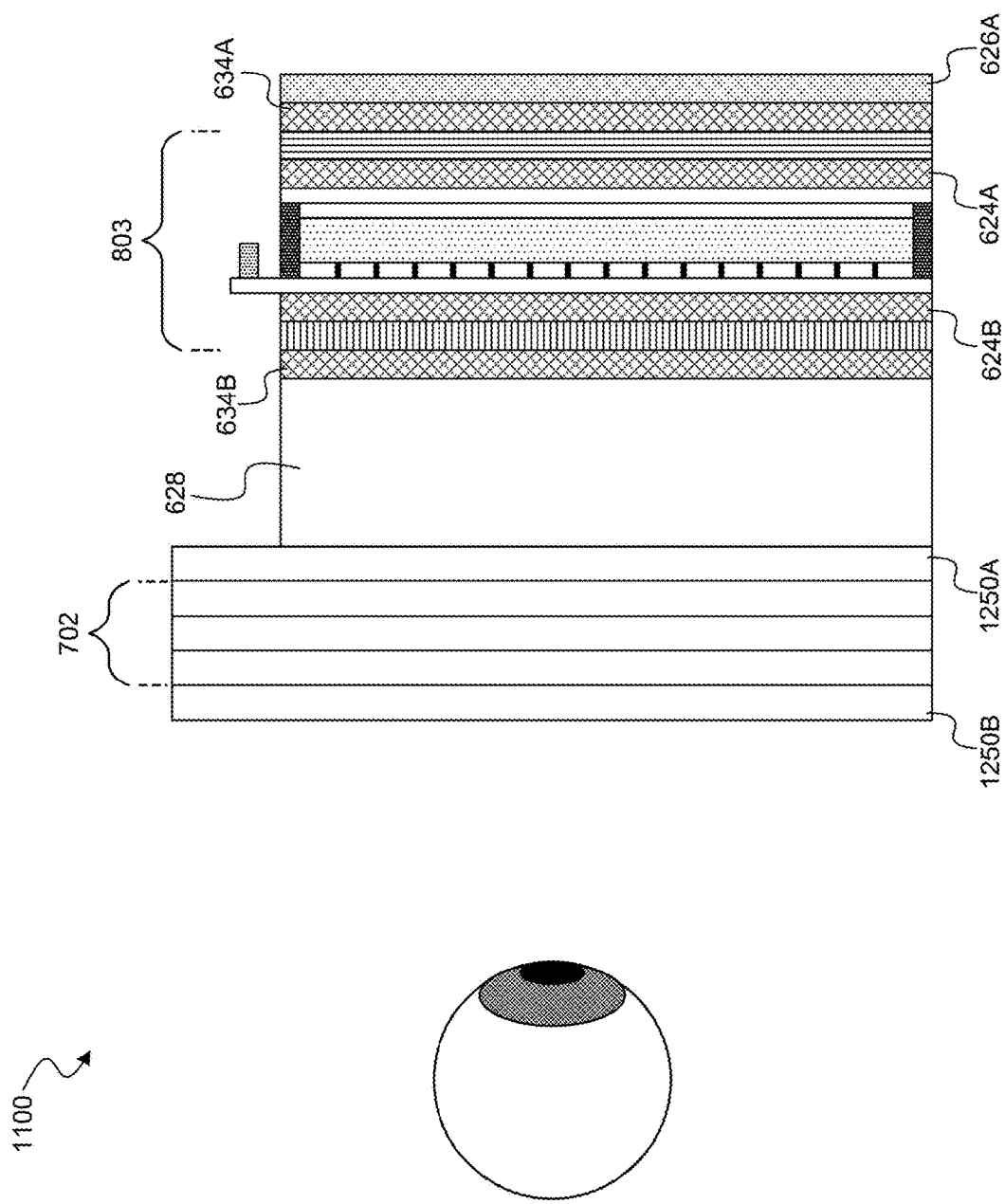
FIG. 11 illustrates an example of a see-through display system according to yet other embodiments of the present disclosure.

FIG. 11 illustrates another example of a see-through display system 1100. The system 1100 of FIG. 11 may correspond to the system 1000 of FIG. 10, but may include an index-matched layer 628 in place of component 626B. The index-matched layer 628 may be a layer of material (e.g., a gel or optical adhesive) having a refractive index equivalent or similar to the refractive index of the second inner QWP 634B or whatever layer of assembly 803 is closest to eyepiece 702. Including an index matching layer may serve to further reduce the presence undesirable effects, such as "ghost" images, by reducing Fresnel reflections of light from eyepiece 702 incident on assembly 803.

In some implementations, a see-through display system may include some or all of the components from each of one or more of FIGS. 8A-11. Other configurations, including see-through display systems with different combinations of components from each of one or more of FIGS. 8A-11, are possible. Although described primarily within the context of optically-transmissive spatial light modulators and displays it is to be understood that one or more of the configurations and techniques described herein may be leveraged in other systems with see-through pixel arrays.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

FIG. 12 shows an example computer system 1200 that includes a processor 1210, a memory 1220, a storage device 1230 and an input/output device 1240. Each of the components 1210, 1220, 1230 and 1240 can be interconnected, for example, by a system bus 1250. The processor 1210 is capable of processing instructions for execution within the system 1200. In some implementations, the processor 1210 is a single-threaded processor, a multi-threaded processor, or another type of processor. The processor 1210 is capable of processing instructions stored in the memory 1220 or on the storage device 1230. The memory 1220 and the storage device 1230 can store information within the system 1200.

The input/output device 1240 provides input/output operations for the system 1200. In some implementations, the input/output device 1240 can include one or more of a network interface device, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., wearable display system 1260. In some implementations, mobile computing devices, mobile communication devices, and other devices can be used.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus comprising:
 a dynamic dimming assembly configured to selectively modulate an intensity of light transmitted parallel to an optical axis of the apparatus, the dynamic dimming assembly comprising:
  a variable birefringence cell;
  a first linear polarizer arranged on a first side of the variable birefringence cell, the first linear polarizer being configured to transmit light propagating parallel to the optical axis linearly polarized along a pass axis of the first linear polarizer orthogonal to the optical axis;
  a quarter wave plate arranged between the variable birefringence cell and the first linear polarizer, a fast axis of the quarter wave plate being arranged relative to the pass axis of the first linear polarizer to transform linearly polarized light transmitted by the first linear polarizer into circularly polarized light; and
  a second linear polarizer on a second side of the variable birefringence cell, wherein the apparatus is an eyepiece; and
 a see-through display comprising a plurality of waveguides, each of the waveguides corresponding to at least one of a different color of light or a different depth of virtual content for presentation by the see-through display, and wherein the first linear polarizer is disposed between the see-through display and the variable birefringence cell.

2. The apparatus of claim 1, wherein the dynamic dimming assembly further comprises an optical retarder arranged between the variable birefringence cell and the second linear polarizer.

3. The apparatus of claim 2, wherein the optical retarder comprises a second quarter wave plate.

4. The apparatus of claim 2, wherein the optical retarder comprises an A-plate with a retardation greater than a retardation of the quarter wave plate.

5. The apparatus of claim 2, wherein a difference between a retardation of the optical retarder and a retardation of the quarter wave plate corresponds to a residual retardation of the variable birefringent cell in a minimum birefringence state.

6. The apparatus of claim 1, wherein the variable birefringence cell comprises a liquid crystal layer.

7. The apparatus of claim 6, wherein the liquid crystal layer is configured in an electrically controllable birefringence mode.

8. The apparatus of claim 6, wherein the liquid crystal layer is a vertically aligned liquid crystal layer.

9. The apparatus of claim 6, wherein the liquid crystal layer comprises a nematic phase liquid crystal.

10. The apparatus of claim 1, wherein the pixels of the variable birefringence cell comprise actively addressed pixels.

11. The apparatus of claim 2, wherein the see-through display comprises one or more waveguide layers arranged to receive light and direct the light away from the dynamic dimming assembly during operation of the apparatus.

12. The apparatus of claim 11, further comprising one or more index-matching layers arranged between the see-through display and the variable dimming assembly.

13. The apparatus of claim 1, wherein the dynamic dimming assembly comprises one or more antireflection layers.

14. An augmented reality system comprising the apparatus of claim 1.

15. An apparatus for use in a head-mounted apparatus, the apparatus having a user side facing a user during use of the head mounted apparatus and a world side facing away from the user during use of the head mounted apparatus, the apparatus comprising:

a dynamic dimming assembly configured to selectively modulate an intensity of light incident to the apparatus of the world side and transmitted parallel to an optical axis of the apparatus, the dynamic dimming assembly comprising:
a liquid crystal layer;
a circular polarizer arranged on a first side of the liquid crystal layer and configured to circularly polarize the light; and
a linear polarizer on a second side of the liquid crystal layer and configured to linearly polarize the light; and a see-through display comprising a plurality of waveguides, each of the waveguides corresponding to at least one of a different color of light or a different depth of virtual content for presentation by the see-through display, wherein the circular linear polarizer is disposed between the see-through display and the liquid crystal layer, wherein the apparatus is an eyepiece.

16. The apparatus of claim 15, wherein the circular polarizer comprises a second linear polarizer and a quarter wave plate.

17. The apparatus of claim 16, further comprising an A-plate arranged between the linear polarizer and the liquid crystal layer.

18. The apparatus of claim 15, further comprising a pixelated cell comprising the liquid crystal layer, wherein the pixelated cell is an actively addressed pixelated cell.

19. An augmented reality system comprising the apparatus of claim 18.

* * * * *